United States Patent
Kannan et al.

(10) Patent No.: US 7,996,251 B2
(45) Date of Patent: Aug. 9, 2011

(54) SYSTEM AND METHOD FOR CUSTOMER REQUESTS AND CONTACT MANAGEMENT

(75) Inventors: Pallipuram V. Kannan, Los Gatos, CA (US); Reagan Miller, Los Gatos, CA (US); Mohit Jain, Banglore (IN)

(73) Assignee: 24/7 Customer, Inc., Santa Clara, CA (US)

(*) Notice: Subject to any disclaimer, the term of this patent is extended or adjusted under 35 U.S.C. 154(b) by 1146 days.

(21) Appl. No.: 11/725,328

(22) Filed: Mar. 19, 2007

(65) Prior Publication Data
US 2007/0198368 A1   Aug. 23, 2007

Related U.S. Application Data

(63) Continuation-in-part of application No. 11/360,145, filed on Feb. 22, 2006, now Pat. No. 7,761,321.

(51) Int. Cl.
*G06Q 90/00* (2006.01)
*G06Q 99/00* (2006.01)

(52) U.S. Cl. .................................. 705/7.13; 705/7.12

(58) Field of Classification Search ............... 705/8, 9, 705/7.12, 7.13, 7.15, 7.16; 709/219
See application file for complete search history.

(56) References Cited

U.S. PATENT DOCUMENTS

| | | | |
|---|---|---|---|
| 6,157,655 A * | 12/2000 | Shtivelman | 370/412 |
| 6,389,028 B1 | 5/2002 | Bondarenko et al. | |
| 6,523,022 B1 | 2/2003 | Hobbs | |
| 6,728,363 B2 * | 4/2004 | Lieberman et al. | 379/266.06 |
| 6,898,190 B2 * | 5/2005 | Shtivelman et al. | 370/270 |
| 7,120,700 B2 | 10/2006 | Macleod et al. | |
| 7,181,444 B2 | 2/2007 | Porter et al. | |
| 7,215,759 B2 * | 5/2007 | Brown et al. | 379/266.06 |
| 7,353,035 B1 | 4/2008 | Kupsh et al. | |
| 7,761,321 B2 * | 7/2010 | Kannan et al. | 705/8 |

(Continued)

FOREIGN PATENT DOCUMENTS

EP   1513088   3/2005

OTHER PUBLICATIONS

International Search Report and Written Opinion for related PCT application No. PCT/US2009/035071 filed Feb. 25, 2009, date of mailing of ISR May 4, 2009, 11 pages.

(Continued)

*Primary Examiner* — Nicholas D Rosen
(74) *Attorney, Agent, or Firm* — Michael A. Glenn; Glenn Patent Group

(57) ABSTRACT

A method and a web-based system is provided that enables a customer service center of a company to provide its customers with a choice of different modes for establishing contact with customer service representatives. The different modes of contact are displayed on a single web page. The modes of contact include, but are not limited to call, chat, email and Internet talk. Further, the system provides information regarding the estimated wait time and the less busy time for the modes of contact. In addition, the system and method provide means for conducting a search in a knowledge database for automated responses to queries from customers. The system and method enables the customer to provide feedback for each interaction with the customer service center through the web page. Further, the system and method enable the storage of all interaction between each customer and the customer service center.

51 Claims, 18 Drawing Sheets

U.S. PATENT DOCUMENTS

| | | | |
|---|---|---|---|
| 2002/0047859 A1 | 4/2002 | Szlam et al. | |
| 2002/0083067 A1 | 6/2002 | Tamayo et al. | |
| 2002/0114442 A1* | 8/2002 | Lieberman et al. | 379/266.06 |
| 2002/0196926 A1* | 12/2002 | Johnson et al. | 379/265.02 |
| 2003/0144895 A1 | 7/2003 | Aksu et al. | |
| 2003/0174830 A1 | 9/2003 | Boyer et al. | |
| 2004/0117383 A1 | 6/2004 | Lee et al. | |
| 2004/0141508 A1* | 7/2004 | Schoeneberger et al. | 370/401 |
| 2005/0004978 A1 | 1/2005 | Reed et al. | |
| 2005/0097159 A1* | 5/2005 | Skidgel | 709/200 |
| 2005/0147090 A1 | 7/2005 | MacLeod Beck et al. | |
| 2005/0207559 A1* | 9/2005 | Shtivelman et al. | 379/266.06 |
| 2005/0246422 A1* | 11/2005 | Laning | 709/205 |
| 2006/0083362 A1* | 4/2006 | Anisimov et al. | 379/88.17 |
| 2006/0277550 A1* | 12/2006 | Williams et al. | 718/107 |
| 2007/0021966 A1* | 1/2007 | Ellefson et al. | 705/1 |
| 2007/0043608 A1 | 2/2007 | May et al. | |
| 2007/0116239 A1* | 5/2007 | Jacobi et al. | 379/265.02 |
| 2007/0198323 A1 | 8/2007 | Bourne et al. | |
| 2007/0244738 A1 | 10/2007 | Chowdhary et al. | |
| 2008/0167952 A1 | 7/2008 | Blair | |
| 2009/0222313 A1* | 9/2009 | Kannan et al. | 705/9 |
| 2010/0262549 A1* | 10/2010 | Kannan et al. | 705/304 |

OTHER PUBLICATIONS

Denton, H.; "Call Center Brings Quantifiable Advantages to Bottom Line"; Jul. 1998; Electric Light and Power, p. 17.

Jones, C.; "Entrepreneur Offers Chance to Jump the Queue"; Nov. 19, 2005; Times Higher Education Supplement, No. 1718, p. 8.

International Search Report and Written Opinion for related PCT application No. PCT/US09/61924 filed on Oct. 23, 2009, mailing date of ISR Jun. 8, 2010, 9 pages.

International Search Report and Written Opinion for related PCT application No. PCT/US07/03970 filed on Feb. 15, 2007, mailing date of ISR Oct. 1, 2007, 9 pages.

Gans, Noah et al.; *Telephone Call Centers: A Tutorial and Literature Review*; 2003; In Manufacturing and Service Operations Management 5, No. 2, http://www.columbia.edu/~ww2040/tutorial.pdf.

International Search Report and Written Opinion for PCT application No. PCT/US2009/035071, date of mailing May 4, 2009.

* cited by examiner

SYSTEM AND METHOD FOR CUSTOMER REQUESTS AND CONTACT MANAGEMENT

CROSS REFERENCE TO RELATED APPLICATIONS

This application is a continuation-in-part of U.S. patent application Ser. No. 11/360,145 filed Feb. 22, 2006, now U.S. Pat. No. 7,761,321.

BACKGROUND

The present invention generally relates to the field of customer requests and contact management. More specifically, it relates to the field of providing solutions to customers' queries through a web-based system.

Due to the competitive environment, various companies are competing to provide better services to their customers, so that the customers have to put in a minimal effort to obtain solutions to their queries.

One of the problems faced by these companies is providing solutions to queries from customers in minimal time. The customers of a company may contact the customer service representatives of the company through various modes, such as a telephone call, chat, or email, and they may have to wait for some time, perhaps a long period of time, before the customer service representatives respond.

In the present state of the art, companies provide a list of customer service contact numbers on their web pages. Some existing companies also have individual web interfaces to provide links for initiating other modes of contact.

However, companies may not be able to provide a customer with a single web page from which the customer can gather information about all the modes of contact the companies may provide. Moreover, companies may not notify the customer regarding the time for which the customer has to wait to get a response to a query. Further, these companies may not provide customers with an option to obtain solutions to their queries through an automated response system. This may lead to higher costs for providing services to their customers.

Moreover, in the present art, the availability of different modes of contact on separate web pages results in higher staffing requirements. At times, the customer is not aware of other alternatives to resolve his/her query or to make a request, which, in turn, increases the frequency of telephone calls to contact these companies. This leads to prominent peaks and valleys in the incoming and outgoing calling patterns of a company. In addition, customers are usually not informed about the new products and services launched by these companies. Moreover, companies may not conduct customer service related surveys. In case these companies conduct such surveys, they are costly, time consuming, or too cumbersome and complicated. Thus these companies may not keep track on customer feedback. In addition, companies may not maintain a comprehensive collection of data relating to interactions between the company and its customers.

In view of the foregoing, there is a need for a system and a method that would enable companies to provide better services to their customers. Further, there is a need for a system that provides various modes through which companies may be contacted on a single user interface or web page. In addition, there is a need for a system that enables a customer to establish contact with a customer service representative through two or more modes of contact at a particular time. Moreover, there is a need for a system that would enable companies to notify a customer about the time for which the customer has to wait before a response is provided to his/her query through the different modes of contact. Further, there is a need to provide a system that would enable companies to store certain automated responses to frequently asked questions by customers, thereby reducing the overall cost of providing services. There is a need of a system that would provide an option to customers to establish contact through other modes of contact when the time spent by the customers exceeds a threshold time through a particular mode of contact. There is a need of a system that would provide an update on the status of a request or query made by customers through a web page. Further, there is a need of a system to enable a customer service representative to co-browse a web page along with a customer and fill forms along with the customer. In addition, there is a need to provide a system and a method that would enable companies to more easily conduct customer service related surveys as well as maintain comprehensive data related to interactions between companies and their customers.

SUMMARY

An objective of the invention is to enable a company with a customer service center to provide better services to customers in an easy and cost-effective way.

Another objective of the invention is to enable the company to provide all the modes through which the customers may contact the customer service center on a single web page. The modes of contact include, but are not limited to, call, chat, email, Internet talk, Interactive Voice Response (IVR), and so forth. The modes of contact may further include chat with an auto-customer service representative (i.e., an automated text or voice recognition and response system), Internet talk with an auto-customer service representative and so forth. The IVR mode of contact may include speech recognition and response based systems.

Yet another objective of the invention is to enable a customer to establish contact with the customer service representative through two or more modes of contact at a particular time. The modes of contact include, but are not limited to, call, chat, email, Internet talk, Interactive Voice Response (IVR) and so forth. The modes of contact may further include chat with an auto-customer service representative, Internet talk with an auto-customer service representative and speech recognition and response based systems.

Still another objective of the invention is to enable the customer service representative of the company to co-browse a web page along with the customer.

Still another objective of the invention is to enable the customer service representative of the company to fill in a form along with the customer. Further, the customer service representative may transfer control entirely to the customer while filling details in specific fields of the form.

Still another objective of the invention is to provide the customers with estimated wait times and access to less busy times for the modes of contact through the web page. The modes of contact include, but are not limited to, call, chat, Internet talk and so forth.

Still another objective of the invention is to provide the customers with estimated response time and resolution time for the modes of contact through the web page. The modes of contact include, but are not limited to, email and so forth.

Still another objective of the invention is to keep a track of the time spent by the customer to resolve a query though automated response systems provided by the company. In addition, to enable the company to provide an option to the customer to establish contact through another mode of contact when the time spent exceeds a threshold time. The automated response systems include, but are not limited to, chat with an auto-customer service representative, Internet talk with an auto-customer service representative, and so forth.

Still another objective of the invention is to enable the customers of a company to create customer login names for interacting with the company.

Still another objective of the invention is to generate a ticket number corresponding to each query asked or request made by the customer. The customer may use the ticket number as reference to track the status of the request or the query through the web page.

Still another objective of the invention is to update the web page regarding status of a query asked or the request made by the customer corresponding to the ticket number.

Still another objective of the invention is to enable the customers to define a query accurately for faster resolution through the web page.

Still another objective of the invention is to enable the customers to obtain one or more solutions to a problem encountered by the customers after purchasing company's product or availing company's service.

Still another objective of the invention is to provide the customers with an automated response to a query entered by the customers through the web page. The automated response is provided by a knowledge database upon meeting certain criteria of appropriateness to the query.

Still another objective of the invention is to provide pay-for-service option to the customers through the web page. The customers may pay for a service to obtain a special set of privileges.

Still another objective of the invention is to conduct customer service related surveys and obtain feedback from the customers upon the completion of their requests.

Yet another objective of the invention is to provide customers with maps and directions to the available service and sales centers of the company.

Still another objective of the invention is to store interactions between the customers and the customer service center in a Customer Relationship Management (CRM) system.

To achieve the above-mentioned objectives, the present invention provides a method and a system for enabling the customers to access and obtain information regarding different modes of contact. Different modes of contact establish contact between the customers and the customer service center. The customers may obtain real-time information regarding 'estimated wait times' and 'less-busy times' for the modes of contact through the web page. Further, the present invention provides options such as a call-back option and a message service (Short Message Service/Multimedia Message Service) option to the customers through the web page. A customer may select the call-back option for a particular type of request. If the call-back option is selected, a customer service representative would call the customer back at an appropriate time. In addition, the customer may select the message option. If the message option is selected, a message would be sent to the customer, updating him/her about the estimated wait time for a selected queue if the estimated wait time falls below a certain predetermined value within a specified time frame. In case the estimated wait time never falls below the predetermined value within the specified time frame, a message is sent to the customer. The message includes, but is not limited to, a text message (SMS), a multimedia message (MMS), and so forth. The message notifies the customer that the estimated wait time did not fall below the predetermined value in the specified time frame. Further, the message may additionally recommend to the customer other suitable time frames to call the customer service center.

In addition, the present invention provides an option to the customers for scheduling a talk with a customer service representative through the web page. The option for scheduling a talk enables the customer to schedule the talk at a particular time with the customer service representative depending on the type of request. Further, the option for scheduling a talk enables the customer to select one from the modes of contact for interacting with the customer service representative. The modes of contact include, but are not limited to, call, chat, Internet talk and so forth.

Further, the present invention provides an option to the customer service representative to co-browse the web page along with the customer for better and efficient interaction with the customer. In addition, the present invention provides an option to the customer service representative to fill in a form along with the customer. Further, the invention enables the customer service representative to transfer control entirely to the customer while filling in details in specific fields of the form, In addition, the present invention provides an option to the customer to establish contact with the customer service representative through two or more modes of contact at the same time.

The present invention further enables the customer to create a customer login name through the web page. The customer may use the customer login name while interacting with the company through the web page. Further, the present invention enables the company to generate a ticket number for each request made or query asked by the customer through the web page. The customer may use the ticket number as a reference to view the status of the request or the query through the web page.

The present invention further enables the customer to define a query through web page by displaying a define-query option. The customer enters the query through the web page. The web page further displays query-defining options to the customer. Further, on selection of any one of the query-defining options by the customer, the web page may display sub-query-defining options on the web page for the customer to define the query precisely. In addition, the web page may display problem capture forms for helping the customer to define a query accurately. The customer fills in the problem capture forms to define the query.

The present invention further enables the web page to display a purchase-related-query option to enable the customer to obtain a solution to a problem. The problem may be related to a product purchased or a service availed by the customer. The web page displays one or more solutions to the problem entered by the customer. Further assistance may be provided to the customer by displaying alternative ways through the web page for contacting the customer service center. The alternative ways may include, but are not limited to, establishing contact through various modes of contact such as call, chat, email, Internet talk, IVR, and so forth Further, the present invention enables the company to keep a track of time spent by the customer while trying to resolve a query through an automated response system through the web page. Examples of automated response system include, but are not limited to, chat with an auto-customer service representative, Internet talk with an auto-customer service representative, and so forth. The present invention enables the company to provide an option to the customers to establish contact through other modes of contact to resolve the query if the time spent exceeds a threshold time. The other modes of contact include, but are not limited to, chat with a customer service representative, Internet talk with a customer service representative and so forth.

Further, the present invention enables the company to update the web page regarding status of a query asked or the request made by the customer corresponding to the ticket number.

In addition, the present invention provides a knowledge database search option to the customers, who may enter a query to search through the web page. The search is conducted in the knowledge database. An automated response is provided to the customers through the web page. Further, along with the automated response, a list of modes of contact, arranged on the basis of the estimated wait time and the type of request/query, is displayed on the web page.

Further, the present invention provides another option, pay-for-service, to the customers through the web page. The customers may pay for service and obtain an additional set of privileges. The set of privileges may include, but is not limited to, faster response to the request. For example, the pay-for-service option may include an option to pay a premium fee in order to exchange position in a queue of customers.

In addition, the present invention provides an interface to the customers to provide feedback on the completion of their request. This feedback is further utilized to analyze and improve the services being delivered to the customers.

Moreover, the present invention provides an option to the customers to retrieve maps and directions to the nearest location of a service or sales center.

In addition, the present invention provides a system and a method to store data relating to interactions between the customers and the customer service center in the CRM system. The interactions may be through the web page, a telephone call or any other means of communication. While providing assistance to the customer, the customer service representative can retrieve all interactions between the customer and the customer service center stored in the CRM system. Further, the CRM system analyzes the interactions stored in the CRM system. The analysis further helps to predict possible problems which may be faced by the customer and customer behavior in a particular market segment and/or demographic segment regarding different products and services available.

BRIEF DESCRIPTION OF THE DRAWINGS

The preferred embodiments of the invention will hereinafter be described in conjunction with the appended drawings that are provided to illustrate, and not limit the invention, wherein like designations denote like elements, and in which.

DESCRIPTION OF PREFERRED EMBODIMENTS

Figure 1:
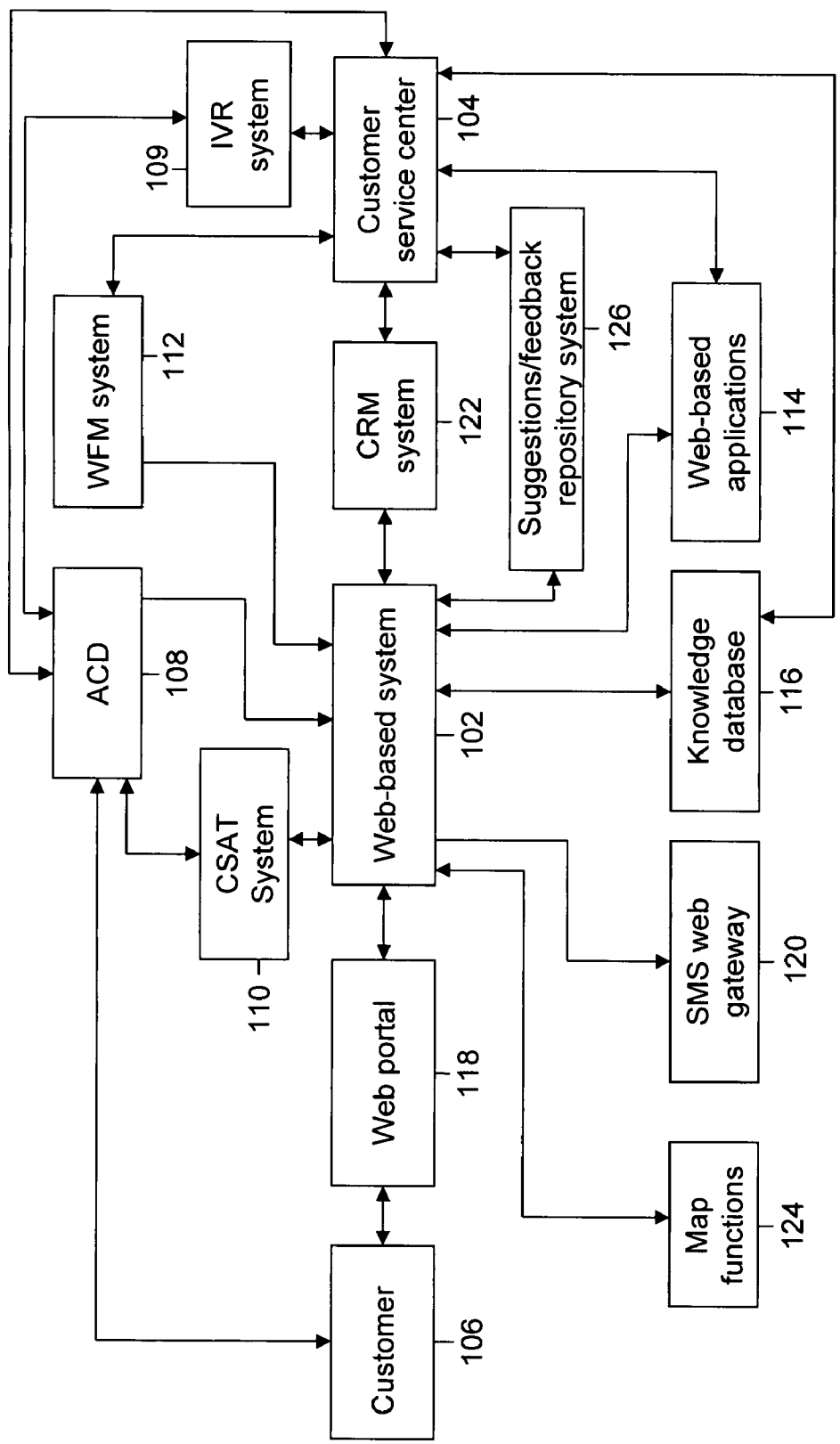
FIG. 1 is a block diagram depicting the environment of a web-based system, in accordance with an embodiment of the invention.

For the sake of convenience, the terms used to describe the various embodiments have been defined below. It should be noted that these definitions are provided to merely aid in understanding the descriptions, and they do not, in any way, limit the scope of the present invention.

Customer service center: A customer service center of a company provides assistance and general support to customers of the company.

Web portal: A web portal of the company provides an interface to its customers to explore the company's website through the Internet. The website displays a web page of the company. The customers interact with the company through the web portal of the company.

Web page: A web page refers to a page displaying contents of a website when the Internet is accessed through a device. Examples of the device include, but are not limited to, computer systems connected to the Internet, hand-held devices that can access the Internet and so forth. A web site may contain one or more web pages. The web page can be displayed by using the Internet browsers on the device. Examples of the Internet browsers include, but are not limited to, Microsoft™ Internet Explorer, Netscape™ Navigator, Mozilla™ Firefox and so forth. Further, the web page can be displayed by using mobile browsers through hand-held devices. Examples of mobile browsers include, but are not limited to, Opera™ mobile browser, Mozilla™ mobile browser and so forth. These mobile browsers can be accessed through hand-held devices. Examples of hand-held devices include, but are not limited to, mobile phones, Personal Digital Assistants (PDAs), and so forth. In addition, the web page can be viewed through Kiosk terminals. Kiosk terminals are terminals located at various public places where a user can access the Internet.

Knowledge database: A knowledge database stores technical manuals and technical information. In addition to this, the knowledge database may store certain automated responses and information related to general queries from the customers. Further, the knowledge database may store details of interactions occurring between each customer and the customer service center, for a certain period of time. The interaction may comprise placing a request or a posted query through email or a query entered to search for information in the knowledge database. Further, the responses sent to the customers through emails may be stored in the knowledge database.

Automatic Call Distributor (ACD): An ACD is a device that handles incoming and outgoing call volume, from, and to the customers. It sends a call to the first available customer service representative and if all the customer service representatives are busy, plays a recorded message and puts calls in a queue until a customer service representative becomes available. Examples of ACDs that are commercially available are products by companies such as Avaya, Rockwell, and Lucent. However, other similar products available commercially may also be used. When a customer calls into the customer service center, the ACD distributes the incoming calls between various customer service representatives in a manner that ensures that the customer is connected to the correct representative in minimal time. The ACD keeps a track on the estimated wait time of each queue of customers. The estimated wait time for an incoming call is the time for which the customer has to wait until he/she is connected with a customer service representative at the customer service center.

Interactive Voice Response (IVR) system: A IVR system is a device that connects a telephone caller to a computer database of a company. The computer database connected through the IVR system provides the telephone caller with a pre-recorded message. The pre-recorded message may further provide options corresponding to services provided by the company to the telephone caller. The telephone caller may select an option by punching keys of a telephone keypad of a telephone being used to call. Instead of punching the keys of the telephone keypad, voice recognition may be used by IVR system to enable the telephone caller to select an option. For voice recognition, a voice browser is used as an interface between the telephone caller and the computer database. Based on the options selected by the telephone caller or the query asked by the telephone caller, the computer database generates automated responses. According to one example of the prior art, the voice browser operates using, VoiceXML interactive application. However, there may be other applications to operate the voice browser in the prior art. The voice browsers are usually connected to the telephone lines of a customer service center. When a customer calls the customer service center for placing a request or asking a query, the voice browser enables the customer to interact with a computer database and receive automated responses. Further, the voice browser automatically connects the customer to a customer service representative if the automated responses generated from the computer database are unable to resolve the customer's query or serve the customer's request.

Work Force Management (WFM) system: A WFM system manages and keeps track of the staffing requirements and the work schedules of customer service representatives at the customer service center. Further, the WFM system stores data related to incoming and outgoing calls on a regular basis. In addition, the WFM system stores data related to a customer service representative's performance and the time taken by the customer service representative to complete each customer's request. The WFM system determines statistical data, based on data collected over a period of time. The statistical data is further used to determine the relatively less busy times for each customer service representative at the customer service center. The less busy time signifies that time during the day when the number of incoming calls received by the ACD is less in proportion to the staffing levels at the customer service center than at other times of the day. This condition of less estimated wait time is therefore predictable to the extent that the incoming call volume and call arrival patterns are calculated against the staffing data. Further, the average amount of time required by the customer service representative to handle the customer's request is based on statistical data determined by the WFM system. Therefore, the WFM system is capable of predicting less busy times of each queue.

Customer Satisfaction (CSAT) System: A CSAT system helps in conducting customer service related surveys and collecting feedback from customers. The CSAT system provides a means for storing, reviewing and analyzing customer feedback.

Customer Relationship Management (CRM) system: A CRM system is an industry term for software solutions, methodologies and Internet capabilities that help companies manage customer relationships in an organized manner. The CRM system includes all aspects of interaction that a company has with its customers, whether it is related to sales or service. The CRM system collects, records, and analyzes customer data so that the time taken to track the interaction of the company with a particular customer is reduced. The customer data includes, but is not limited to, a customer profile, a customer login name, a unique ticket number(s) corresponding to a request(s) placed by the customer, a unique transaction number(s) corresponding to a transaction(s) made by the customer with the company, feedback(s) provided by the customer, history of interactions of the customer with the company and so forth. Analysis of the customer data, in turn, helps in analyzing and predicting customer behavior in a particular market segment and/or demographic segment regarding the different products and services available.

Web-based applications: Web-based applications provide a mode of interaction between two or more persons. Each person accesses the web-based applications through the Internet. Web-based applications include, but are not limited to, chat applications, email applications, Internet talk applications, and so forth. Examples of chat applications include, but are not limited to, Yahoo!® chat, American Online® (AOL), MSN messenger®, and the like. In addition, examples of chat applications include, but are not limited to, an interface provided on a web page, wherein two or more persons interact through the interface provided on the web page. The two persons may not require any chat ID for interacting using the interface. Examples of email applications include, but are limited to, Yahoo!® mail, Gmail®, Hotmail®, Rediffmail®, and so forth. Another example of email applications includes an interface provided on the web page, wherein a person provides personal information and a type of request/query. The personal information includes, but is not limited to, name of the person, email address, contact number of the person and so forth. Another person sends a response to the person directed to the email address of the person. Examples of Internet talk applications include, but are not limited to, Yahoo!® chat with voice application, Google® talk, Skype® and so forth. In addition, examples of Internet talk applications include an interface provided on a web page, wherein two or more persons interact through the interface provided on the web page. The two persons may not require any Internet talk ID for interacting using the interface.

Map function: A map function, usually referred to as an Internet map service, generates maps and/or provides directions to customers for a location. Examples of map functions include, but are not limited to, Yahoo!® Maps, MapQuest®, and so forth.

Message web gateway: A message web gateway provides a means for sending a message from the Internet to a network service provider. The message may include, but is not limited to, a text message, a multimedia message and so forth. The network service provider further sends the message to the intended destination. An example of message web gateway is Cingular® Wireless. However, other similar message web gateways known in the art can also be used.

Suggestions/feedback repository system: A suggestions/feedback repository system enables customers to provide feedback about various services and products offered by a company. The suggestions/feedback repository system stores all the suggestions or feedback provided by the customers. The customers' feedback and suggestions are retrieved by the company on a regular basis and analyzed to improve its products or services.

FIG. 1 is a block diagram, depicting the environment of a web-based system 102, in accordance with an embodiment of the invention. Web-based system 102 is associated with a customer service center 104 of a company. Customer service center 104 provides assistance to customers 106 of the company. Each of customers 106 will hereinafter be referred to as customer 106. Customers 106 and customer service center 104 can interact with each other through web-based system 102. For example, a customer service center of a company providing banking facilities assists its customers in different matters, such as loan facilities, asset management, inquiry relating to personal bank accounts, and so forth.

In an embodiment of the invention, customer service center 104 is supported by systems such as an Automatic Call Distributor (ACD) 108, an Interactive Voice Response (IVR) system 109, a Customer Satisfaction (CSAT) System 110, a Work Force Manager (WFM) system 112, web-based applications 114, a knowledge database 116, a web portal 118, an message web gateway 120, a Customer Relationship Management (CRM) system 122, a map function 124, and a suggestions/feedback repository system 126. Web-based system 102 is associated with supporting systems, namely ACD 108, Interactive Voice Response (IVR) system 109, CSAT system 110, WFM system 112, one or more web-based applications 114, knowledge database 116, web portal 118, message web gateway 120, CRM system 122, map function 124 and suggestions/feedback repository system 126. Web-based system 102, in conjunction with the supporting systems, establishes a contact between customers 106 and customer service center 104. Customer service representatives of customer service center 104 interact and provide assistance to customers 106.

However, in case customer 106 contacts customer service center 104 through a telephone call to place a request or a query, the call is transferred to a customer service representative through ACD 108. If the customer service representative is busy tending another customer, customer 106 may have to wait in a queue of customers. While waiting, ACD 108 may connect customer 106 to an Interactive Voice Response (IVR) system 109. IVR system 109 provides a recorded message to customer 106. The recorded message may provide information such as the estimated wait time after which the customer service representative would respond to customer 106. The estimated wait time for the queue of customers calling a customer service representative at customer service center 104 signifies the time that customer 106 has to wait before the customer service representative responds. According to a method known in the art for the calculation of estimated wait time in a customer service center, customers are already in a queue to contact a customer service representative. The customer service representative takes an average of x minutes to complete a request. Therefore, the customer service representative would take an average of nx minutes to complete n requests from n customers. So, the estimated wait time for the $(n+1)^{th}$ customer is nx minutes. However, for the calculation of estimated wait time, several other algorithms exist in the art and may be used.

In addition, the recorded message provides customer 106 with information relating to different services provided by the company and different products of the company. Further, the recorded message provides options corresponding to different services to customer 106. The recorded message informs customer 106 about the procedure to select an option from the options provided. According to a procedure known in the art, customer 106 may select an option from the options provided by punching keys of a telephone keypad of a telephone being used to make the telephone call. According to another procedure known in the art, voice recognition may be used by customer service center 104 to identify the option selected by customer 106. For voice recognition a voice browser is used by customer service center 104. According to one example of the prior art, the voice browser operates using a VoiceXML interactive application. However there may also be other applications to operate the voice browser in the prior art. The voice browser acts as an interface between customer 106 and a computer database at customer service center 104. When customer 106 selects an option from the options provided, the computer database identifies the option selected by customer 106 using the voice browser and generates an appropriate automated response to the customer 106. Further, when customer 106 asks a query or places a request, the computer database generates an appropriate automated response.

The recorded message may also direct customer 106 to web portal 118 in case customer 106 does not want to wait for the customer service representative to respond. Web portal 118 provides an interface to customer 106, through which customer 106 can contact the customer service representatives through modes of contact, other than a telephone call. Examples of such modes of contacts may be, but are not limited to, chat, email, Internet talk, and so forth.

In an embodiment of the invention, if customer 106 wants to inquire about the various modes of contact that are available to contact customer service center 104, customer 106 may access web portal 118 by connecting to the Internet and visiting the website of the company. Customer 106 may use Internet browsers, mobile browsers, Kiosk terminals and so forth to visit the website of the company. Examples of the Internet browsers include, but are not limited to, Microsoft™ Internet Explorer, Mozilla™ Firefox, Netscape™ Navigator and so forth. Mobile browsers may be used through hand-held devices such as mobile phones, Personal Digital Assistants (PDAs) and so forth. Examples of mobile browsers include, but are not limited to, Opera™ mobile browser, Mozilla™ mobile browser and so forth. Further, Kiosk terminals are located at different public places. Customer 106 may access the Internet through Kiosk terminals. Through web portal 118, customer 106 interacts with web-based system 102, wherein web-based system 102 displays the various modes of contact available for customer 106 to contact customer service center 104, on web portal 118, along with the information related to each mode of contact. Examples of such information may be telephone numbers, chat IDs, email addresses, Internet talk IDs, estimated wait time for one or more modes of contact, less busy times for one or more modes of contact, estimated response time for one or more modes of contact, estimated resolution time for one or more modes of contact and so forth.

Customer 106 can select any desired mode of contact provided on web portal 118. For establishing a contact with customer service center 104, web-based system 102 is connected through one or more web-based applications 114 to customer service center 104. One or more web-based applications 114 include, but are not limited to, chat applications, email applications, Internet talk applications, and the like. Customer 106 may interact with customer service center 104, by making a request or asking a query through web portal 118. Based on the request or query, customer service center 104 provides a response to customer 106. The responses to customer 106 are based on the mode of contact selected by customer 106. Further, the modes of contact are integrated with each other in such a way that customer 106 can establish contact with the customer service representative of customer service center 104 through two or more modes of contact at the same time. In another embodiment of the invention, knowledge database 116 provides an automated response to the query made by customer 106.

ACD 108 provides real-time information regarding the estimated wait time to the web-based system 102. Customer 106 obtains the information regarding the estimated wait time through web-based system 102. WFM system 112 provides real time information regarding less busy times of the customer service representatives to customers 106, through web-based system 102. The less busy times signifies the duration of the day when the number of incoming calls received by the customer service center 104 in proportion to the staffing level is less compared to other times of the day. This, in turn, results in less estimated wait time in the queue. For example, at times during the day a customer service center may receive fewer incoming calls as compared to staffing, thereby reducing the estimated wait time from X hours to Y hours. The estimated wait time for the customer calling at these times would be less, thus getting a faster connection to a customer service representative.

In an embodiment of the invention, message web gateway 120 provides a means for sending a message to customer 106 through the Internet, and through web-based system 102, to a network service provider. The network service provider then sends the message to the contact number of customer 106. Customer 106 may receive information through a message regarding the estimated wait times for different modes of contact. The message includes, but is not limited to, a text message, a multimedia message, and so forth.

In an embodiment of the invention, CSAT system 110 provides a feedback form to customer 106, through web-based system 102 at the completion of a request or a query made by customer 106. Further, CSAT system 110 collects feedback from customers 106 who contact through a telephone call via ACD 108. In another embodiment of the invention, as CSAT 110 is connected to ACD 108, CSAT 110 provides a set of prerecorded instructions to customers 106 and customers 106 may provide their feedback by punching in keys of a telephone keypad or any other device attached to the telephone. The feedback form filled out and provided by customers 106 is stored, reviewed, and analyzed by CSAT system 110. All feedback forms stored in CSAT system 110 are used as a tool to conduct a customer service related survey. The feedback forms are, further used to enhance the service provided by customer service center 104 to customers 106.

In an embodiment of the invention, CRM system 122 interfaces with customer service center 104 and web-based system 102. CRM system 122 records all the interactions that customers 106 have with a customer service representative. The interaction may be through a telephone call, IVR, chat, email or Internet talk, or any other mode of contact. Further, CRM system 122 records all requests that customers 106 place through a message option and a call-back option. In addition, CRM system 122 records all queries entered by customers 106 to be searched in knowledge database 116. Further, CRM system 122 records the interaction of customers 106 through CSAT system 110. CRM system 122 also helps analyze and predict future marketing trends. This, in turn, helps improve customer relationships. Further, CRM system 122 helps deliver better services to customers 106.

In an embodiment of the invention, map function 124 provides a means for finding locations of companies throughout the globe. Map function 124 provides maps and directions to the nearest service and sales center of the company to customers 106.

In an embodiment of the invention, suggestions/feedback repository system 126 enables the customer 106 to provide feedback about various services and products offered by the company. Customer 106 may desire to provide feedback after using a product or availing a service offered by the company for a certain period of time. Suggestions/feedback repository system 126 provides a feedback form to customer 106, when customer 106 desires to provide feedback through the web-based system 102. In an embodiment of the invention, suggestions/feedback repository system 126 enables customer 106 to provide suggestions to improve the products or services offered by the company. Suggestions/feedback repository system 126 acts as a repository of the feedback and suggestions collected from customer 106. In an embodiment of the invention, suggestions/feedback repository system 126 is monitored at regular time intervals by customer service center 104. Further, the feedback and the suggestions are used to enhance the services and the products provided by the company to customers 106.

Figure 2:
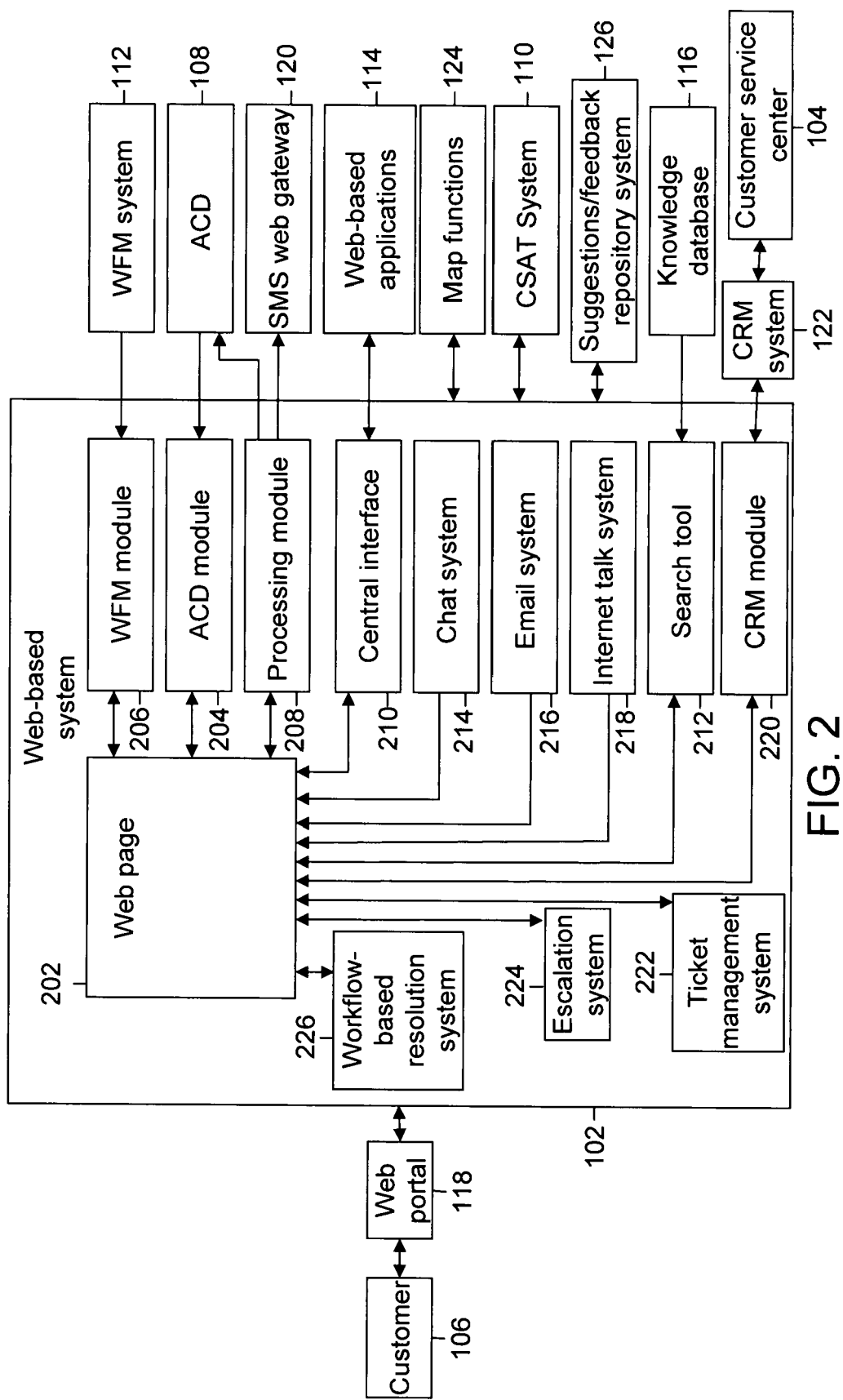
FIG. 2 is a block diagram depicting elements of the web-based system and their interaction with supporting systems, in accordance with an embodiment of the invention.

FIG. 2 is a block diagram, depicting elements of web-based system 102, in accordance with an embodiment of the invention. Web-based system 102 comprises a web page 202, an ACD module 204, a WFM module 206, a processing module 208, a central interface 210, a search tool 212, a chat system 214, an email system 216, an Internet talk system 218, a CRM module 220, a ticket management system 222, an escalation system 224 and a workflow-based resolution system 226.

In an embodiment of the invention, web page 202 displays one or more options that signify modes for establishing a contact between customer 106 and customer service center 104. The modes of contact include, but are not limited to, chat, email, call, Internet talk, IVR and the like. Further, in an embodiment of the invention, web page 202 displays an estimated wait time and a less busy time for the one or more options selected by customer 106.

Further, in an embodiment of the invention, web page 202 displays a call-back option. The call-back option provides a means for placing a request to call back customer 106 corresponding to a queue. The queue refers to a queue of customers trying to establish contact with a group of customer service representatives handling particular types of requests.

When customer 106 selects the call-back option, in an embodiment of the invention, web page 202 displays a customer data collection screen corresponding to the call-back option. Customer 106 can enter data related to the call-back option through web page 202. Examples of data include, but are not limited to, personal details, contact number, the nature of request and queue selected by customer 106. Processing module 208 interacts with web page 202 and sends the data entered by customer 106 to ACD 108. ACD 108 keeps a track of the queue that customer 106 has selected, and builds a connection between customer 106 and a customer service representative available among the group of customer service representatives handling the selected queue in order ACD 108 receives requests of customers 106.

In yet another embodiment of the invention, web page 202 displays a message service option. The message service option is for placing a message request through web page 202 corresponding to a queue. The message request provides a message to customer 106, message being sent through message web gateway 120. The message updates customer 106 regarding the estimated wait time for a selected queue. The queue refers to a queue of customers trying to establish contact with a group of customer service representatives handling requests of a particular nature. The message includes, but is not limited to, a text message, a multimedia message and so forth.

In an embodiment of the invention, when customer 106 selects the message service option, web page 202 displays a customer data collection screen corresponding to the message service option. Customer 106 enters data necessary for completion of the message request through web page 202. Examples of the data include, but are not limited to, information related to personal details of customer 106, a contact number for providing the message, the nature of request and the queue selected. Further, the data comprises a predetermined estimated wait time selected by customer 106 and a specified time frame for which customer 106 wants to place a message request. Processing module 208 interacts with web page 202 and stores the data entered by customer 106 through web page 202. Processing module 208 keeps track of the estimated wait time of the queue selected by customer 106. Processing module 208 sends a message when the estimated wait time of the selected queue falls below the selected predetermined value of estimated wait time, within the specified time frame, to customer 106 through message web gateway 120. In case the estimated wait time of the selected queue does not fall below the predetermined value, processing module 208 sends a message notifying customer 106 about the current estimated wait time and stating that the estimated wait time will not fall below the predetermined value in the specified time frame, and recommending other times, that have a lower estimated wait time, to call the customer service center 104.

Message web gateway 120 can be accessed through the Internet. The message web gateway 120 further sends the message to the network service provider. The network service provider sends the message to the contact number provided by customer 106.

In yet another embodiment of the invention, web page 202 displays a knowledge database search option. The knowledge database search option provides an interface with search tool 212 that allows a search to be conducted in knowledge database 116. If customer 106 selects the knowledge database search option, customer 106 may enter a query to be searched through web page 202. On conducting a search in knowledge database 116, web page 202 displays an automated response corresponding to the query. The automated responses corresponding to the general queries are stored in knowledge database 116. Examples of an automated response may be: "We are sorry, but we can find no relevant matches to your question. Please retype using different words or contact through email, chat, or by phone and we'll be sure to resolve your question" or if the query relates to banking problems such as home-loan facilities provided by the company, the response may be: "The home loan facilities are available at an interest of x % for a time period of p years and at an interest of y % for a time period of q years. For more details, you may contact through email asking for a brochure, giving details about home loan facilities. We hope this has solved your query. You can also contact us through chat, telephone or Internet talk and give us an opportunity to serve you better".

In an embodiment of the invention, when customer 106 enters a request or a query through web page 202, ticket management system 222 assigns a ticket number corresponding to the request or query entered by customer 106. Customer 106 may use the ticket number as reference to track the status of the request or the query through web page 202. The status may provide information relating to the state of the request or the query. Examples of status are 'request submitted', 'request closed', 'request active', 'request to be served on Nov. 10, 2006' and so forth. In an embodiment of the invention, if customer 106 makes a query to which no match of an automated response is found on searching in knowledge database 116, then customer 106 is notified of a suitable time, wherein the suitable time is the maximum time required for updating the knowledge database 116 with an automated response corresponding to the query. Customer service center 104 updates knowledge database 116 with the automated response corresponding to the query before the suitable time notified to customer 106. Customer 106 may then obtain the automated response by providing the ticket number corresponding to the query through web page 202 after the suitable time. Web page 202 displays the automated response corresponding to the ticket number. In an embodiment of the invention, if there exist frequently asked queries that do not have corresponding responses in knowledge database 116, knowledge database 116 may be updated with these queries and their corresponding responses. Further, web page 202 displays a list of modes of contact for assisting customer 106, wherein the list is arranged, based on the estimated wait time for each mode of contact available to customer 106 and the nature of query made by customer 106.

All queries made by customers 106 are stored in search tool 212 for a certain period of time. Customer service representatives can retrieve these queries for their reference while serving a request. Further, these queries would help customer service representatives in understanding a request or query in less time by comparing it to those similar to ones that have been answered, in case customer 106 contacts a customer service representative through any of the various modes of contact to place a request. One or more responses to the queries are stored in search tool 212 for a predetermined period of time.

In an embodiment of the invention, web page 202 displays a customer feedback option. In an embodiment of the invention, customer 106 provides feedback through the customer feedback option at the completion of a request or a query. The feedback is stored in CSAT system 110. All feedback forms stored in CSAT system 110 are used as a tool to conduct a customer service related survey. The feedback forms are further used to enhance the service provided by customer service center 104 to customers 106. In another embodiment of the invention, customer 106 provides feedback after using a product or availing a service offered by the company for a certain period of time. Suggestions/feedback repository system 126 provides a feedback form to customer 106 through web page 202.

In an embodiment of the invention, web page 202 displays a register online option. The register online option enables customer 106 to create a customer login name to interact with customer service center 104 through web page 202. For creating the customer login name, web page 202 displays a registration form. Customer 106 has to fill in the registration form to create the customer login name. The customer login name is allocated by customer service center 104 to customers 106 and is unique for each of customers 106 who have registered through web page 202. Customer 106 interacts with web-based system 102 using the customer login name, wherein web page 202 displays the various modes of contact available for customer 106 to contact customer service center 104, on web portal 118, along with the information related to each mode of contact. Examples of such information may be telephone numbers, chat IDs, email addresses, Internet talk IDs, estimated wait time for one or more modes of contact, less busy times for one or more modes of contact, estimated response time for one or more modes of contact, estimate resolution time for one or more modes of contact and so forth.

In an embodiment of the invention, web page 202 displays a define-query option. The define-query option enables customer 106 to define a query accurately for faster resolution through web-based system 102. Customer 106 enters the query through web page 202. The query may be relating to a particular product or service provided by the company. Web page 202 displays query-defining options to customer 106. Examples of query-defining options include, but are not limited to, options describing different engagement stages such as 'After buying a product online', 'After shipment', 'After receipt', 'On installation and commissioning', 'On integration with other devices', 'On initial usage', 'On matured usage' and so forth. Customer 106 may select one of the query-defining options. Further, on selection of any one of the query-defining options, web page 202 may display sub-query-defining options on web page 202 for customer 106 to define the query precisely. In another embodiment of the invention, web page 202 displays problem capture forms for helping customer 106 to define a query accurately. Customer 106 fills in the details asked by the problem capture forms through web page 202. The details may include, but are not limited to, personal information, questions having more than one query-defining option and so forth. Personal information may include, but is not limited to, name of the customer, contact number of the customer, customer login name, and so forth.

In an embodiment of the invention, web page 202 displays a purchase-related-query option. The purchase-related-query option enables customer 106 to obtain a solution to a problem through web-based system 102. Customer 106 enters the problem through web page 202. The problem may be related to a product purchased or a service availed by customer 106. Web page 202 displays one or more solutions to the problem entered by customer 106. If the one or more solutions displayed on web page 202 do not solve the problem of customer 106, then customer 106 may ask for further assistance through web page 202. On asking for further assistance, web page 202 may provide alternative ways for contacting customer service center 104. The alternative ways may include, but are not limited to, establishing contact through various modes of contact such as call, chat, email, Internet talk, IVR, and so forth.

In another embodiment of the invention, web-based system 102 includes central interface 210. Central interface 210 provides an interface between web page 202 and one or more web-based applications 114. Customer 106 contacts customer service center 104 through web page 202 and establishes contact with the support of web-based applications 114. Central interface 210 links web page 202 to web-based applications 114. In addition, central interface 210 integrates two or more web-based applications 114 with each other. This enables customer 106 to establish contact with the customer service representative through two or more modes of contact at the same time. The modes of contact include, but are not limited to, chat, email and Internet talk.

In yet another embodiment of the invention, web-based system 102 comprises ACD module 204, which provides an interface between ACD 108 and web page 202. ACD 108 provides real-time information regarding the estimated wait time for one of the modes of contact, the mode of contact being call. Web page 202 displays the estimated wait time provided by ACD 108 through ACD module 204.

In yet another embodiment of the invention, web-based system 102 comprises WFM module 206. WFM module 206 provides an interface between WFM system 112 and web page 202, which displays the less busy time. WFM system 112 provides information regarding the less busy time for call, the most suitable mode of contact on a real-time basis.

In yet another embodiment of the invention, web-based system 102 comprises chat system 214. Chat system 214 handles all incoming chat requests from customers 106. It tracks the chats being initiated by customers 106 for a particular duration of day and calculates the estimated wait time and the less busy time for each queue. The queue refers to a queue of customers trying to establish contact with a customer service representative from a group of customer service representatives, handling requests of similar type, through chat. Estimated wait time refers to the time a customer has to wait until he/she obtains a response from a customer service representative through chat. Less busy time signifies the time during the day when the number of requests received by customer service center 104, in proportion to the staffing levels, is less compared to the number of requests received at other times. In addition, when the customer service representative selects an option to co-browse with customer 106, chat system 214 enables the customer service representative to browse web page 202 along with customer 106. In an embodiment of the invention, chat system 214 enables a customer service representative to fill in a form displayed on web page 202 along with customer 106. Chat system 214 further enables the customer service representative to transfer the control entirely, for filling in the details of specific fields of the form, to customer 106. The details of the specific fields of the form may be confidential and thus should be known only to customer 106. Examples of specific fields of the form include, but are not limited to, passwords, transaction login name and password while making online payments, and so forth.

In yet another embodiment of the invention, web-based system 102 comprises email system 216. Email system 216 keeps track of incoming emails from customers 106 and the responses being sent to them. In turn, email system 216 determines estimated response time and estimated resolution time. The estimated response time refers to the time a customer 106 has to wait until he/she receives a response from customer service center 104. The estimated resolution time refers to the time a customer 106 has to wait until the request/query made by customer 106 is resolved by customer service center 104.

In yet another embodiment of the invention, web-based system 102 comprises Internet talk system 218. Internet talk system 218 keeps track of all the Internet talk requests from customers 106 and calculates the estimated wait time and the less busy time for each queue. The queue refers to a queue of customers trying to establish contact with a customer service representative among a group of customer service representative, handling requests of similar type, through Internet talk. Estimated wait time refers to the time a customer has to wait until he/she obtains a response from a customer service representative through Internet talk. Less busy time signifies that time during the day when the number of requests through Internet-related communication received by customer service center 104 in proportion to the staffing levels is less compared to the number of requests received at other times. In addition, when the customer service representative selects an option to co-browse with customer 106, Internet talk system 214 enables the customer service representative to browse web page 202 along with customer 106. In an embodiment of the invention, Internet talk system 218 enables a customer service representative to fill in a form displayed on web page 202 along with customer 106. Internet talk system 218 further enables the customer service representative to transfer the control entirely, for filling in the details of specific fields of the form, to customer 106. The details of the specific fields of the form may be confidential and thus should be known only to customer 106. Examples of the specific fields of the form include, but are not limited to, passwords, transaction login name and password while making online payments, and so forth.

In yet another embodiment of the invention, web-based system 102 includes CRM module 220, which provides an interface between web page 202 and CRM system 122. CRM module 220 provides all interactions between customer 106 and customer service center 104 to CRM system 122 through web page 202. CRM module 220 provides the interaction between customer 106 and customer service center 104, using any of the modes of contact, namely, chat, email, and Internet talk, to CRM system 122. Further, CRM module 220 communicates with CRM system 122 regarding the interaction through the call-back option and the message option provided on web page 202. In addition, CRM module 220 communicates with CRM system 122 regarding the interaction through the queries entered by customers 106 to be searched in knowledge database 116. In addition, CRM module 220 passes on the feedback being provided by customers 106 to CRM system 122 at the end of each interaction with customer service center 104.

In yet another embodiment of the invention, web-based system 102 includes a ticket management system 222. When customer 106 makes a request or asks a query through web-based system 102, ticket management system 222 assigns a ticket number to the request made or query asked by customer 106. In an embodiment of the invention, when customer 106 makes a transaction through the web-based system 102, ticket management system 222 assigns a ticket number to the transaction. Examples of transaction include, but are not limited to, buying a product online, making online payments for shipping of a product and so forth. Customer 106 may use the ticket number as reference to keep track of the status of the request, the query or the transaction made through web based system 102. The status may provide information relating to the state of the request, the query or the transaction. Examples of status include 'request submitted', 'request closed', 'request active', 'request to be served on Nov. 10, 2006' and so forth. In an embodiment of the invention, customer 106 uses the ticket number to obtain alert messages. Examples of the alert messages include, but are not limited to, email alert messages, alert messages through a dedicated alert system, messages on hand-held devices, messages through a web portal and so forth. Examples of hand-held devices include, but are not limited to, mobile phones, PDAs, and so forth.

In an embodiment of the invention, web-based system 102 includes an escalation system 224. Customer 106 tries to resolve a query by selecting an automated response system through a mode of contact displayed on web page 202. The mode of contact includes, but is not limited to, call, chat, email, Internet talk and so forth. Escalation system 224 keeps a track of the time spent by a customer 106 in trying to resolve a query through the automated response system via the selected mode of contact. The automated response system may include, but is not limited to, establishing contact with an auto-customer service representative through chat, establishing contact with an auto-customer service representative through Internet talk and so forth, If the time spent by customer 106 exceeds a particular threshold time, escalation system 224 would provide an option to customer 106 to establish contact through other modes of contact. The other modes of contact may resolve the query. The other modes of contact include, but are not limited to, call, chat, email, Internet talk, IVR and so forth. For example, a customer tries to resolve a query relating to a product feature by establishing a chat with an auto-customer service representative through a web page of a company, but is unable to do so within 30 minutes. An escalation system enables the company to provide an option to the customer to establish contact through other modes of contact like a call with a customer service representative, Internet talk with a customer service representative and so forth. The customer may select any of these modes of contact to resolve the query.

In an embodiment of the invention, web-based system 102 includes a workflow-based resolution system 226. Customer 106 visits web page 202 to place a request or to make a query. Ticket management system 222 assigns a ticket number to the request or the query. When the process to be followed to complete the request or answer the query requires an offline activity to be performed, workflow-based resolution system 226 initiates a pre-defined process corresponding to the request or the query. The pre-defined process includes a set of activities to be performed by one or more task owners. The one or more task owners include, but are not limited to, automated systems, customer service representatives, employees of other companies and so forth. Customer 106 can visit web page 202 to view status of the request or the query corresponding to the ticket number. The status may provide information relating to the state of the request or the query. Examples of status are 'request submitted', 'request closed', 'request active', 'request to be served on Nov. 10, 2006' and so forth. The task owner through workflow-based resolution system 226 updates the status about the activities performed.

In an embodiment of the invention, if the task owner is an automated system, an auto-update is made through workflow-based resolution system 226. In an embodiment of the invention, if the task owner is a customer service representative or an employee of another company, an update is made manually by the task owner through workflow-based resolution system 226. For example, a customer places a request to issue a cheque book through a web page of a bank. To complete the process of issuing a check book, a set of activities is to be performed. The set of activities include automatically generating a request through a web portal of the bank, automatically alerting a concerned employee of the bank regarding the request of the check book, intimating the printing department to print the check book by the concerned employee, obtaining the printed check book from the printing department, sending the check book through a postal service to the customers mailing address, and confirming the receipt of the check book by the customer. On completion of an activity, the status is updated on the web page. The customer can view the status through the web page.

In another embodiment of the invention, workflow-based resolution system 226 generates alerts regarding the completion of the activities to be performed by the one or more task owners. The customers receive the alerts through one or more channels. The channels include, but are not limited to, call, text message, multimedia message, email, pre-recorded voice message and so forth.

Figure 3:
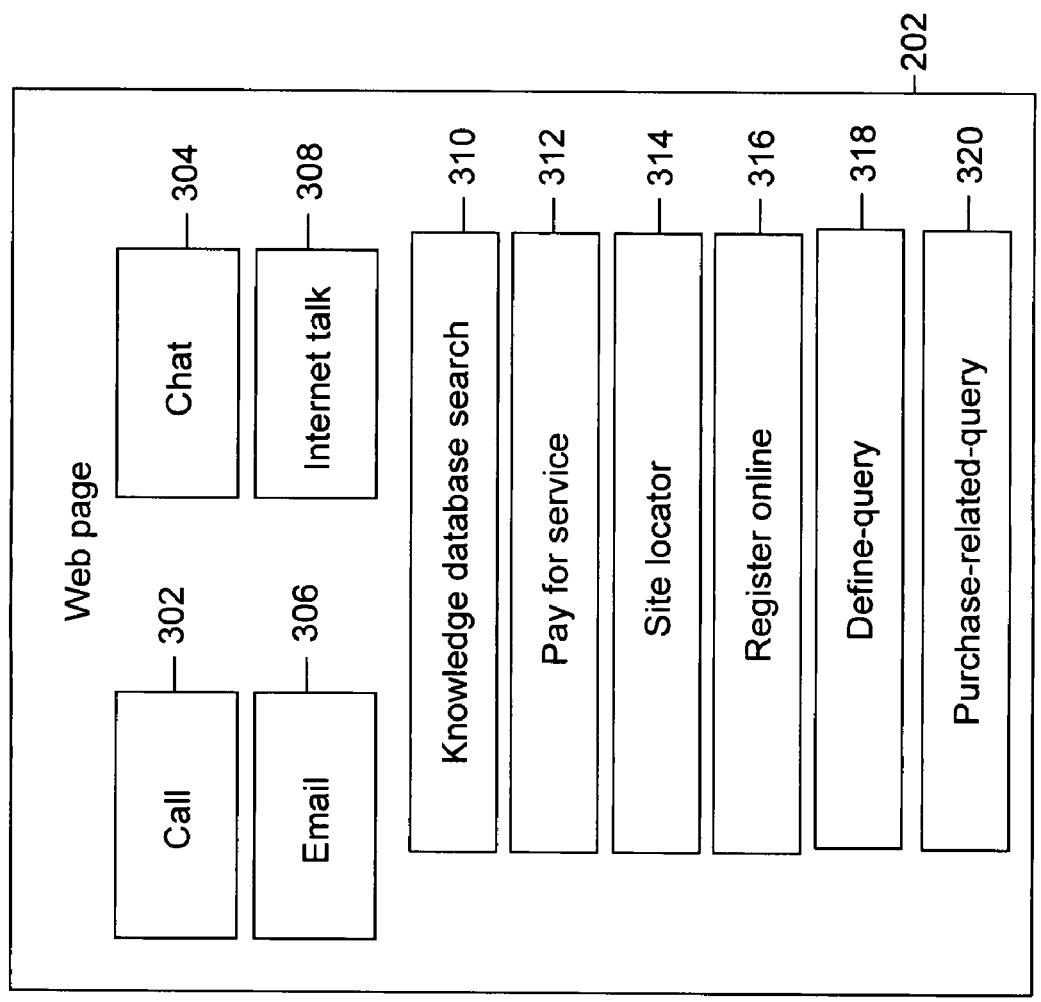
FIG. 3 illustrates content to be displayed on a web page provided by the web-based system, in accordance with an embodiment of the invention.

FIG. 3 illustrates the content displayed on a web page 202 provided by the web-based system 102, for interaction between customer 106 and customer service center 104, in accordance with an embodiment of the invention. Web page 202 includes or displays a call option 302, a chat option 304, an email option 306, and an Internet talk option 308. Web page 202 displays these one or more options, for depicting corresponding modes of contact, call, chat, email, and Internet talk, between customer 106 and customer service center 104. However, the modes of contact are not limited to the examples provided and there can be other modes known in the art.

In an embodiment of the invention, web page 202 further includes or displays a knowledge database search option 310. In another embodiment of the invention, web page 202 includes or displays pay-for-service options 312. Pay-forservice options 312 provide privileges to customers 106 who wish to pay for the services provided by customer service center 104. In case a customer selects one of the pay-for-service options, the customer is provided a set of privileges for the particular request selected. The set of privileges include, but are not limited to, faster response to the request made by customer 106. The set of privileges, further, includes a special toll-free-number to contact a customer service representative through telephone. The toll-free-number, in turn, guarantees lower estimated wait time for the specified queue. The pay-for-service option further includes an option to pay a premium fee in order to exchange position in a queue of customers. Customer 106 may then pay the premium fee to obtain a faster response from a customer service representative. The pay-for-service option further includes an option to obtain an 'express card' through which customer 106 gets an opportunity to exchange positions in the queue each time he/she tries to avail a service or place a request.

In yet another embodiment of the invention, the pay-for-service option further includes paid clubs that provide the set of privileges on a regular basis, and not for merely a particular request. Customer 106 may enroll themselves for the paid clubs such as a 'Premium Service Club'. In another embodiment of the invention, web page 202 can advertise for the services provided by the company, about new products and services of the company, and also provide updates regarding the available products and services.

In an embodiment of the invention, when customer 106 purchases a product or a service of the company, customer 106 is provided with an option to subscribe to special service packages. If customer 106 purchases the product or the service through web page 202, the option is provided through web page 202. The service packages include one or more offers for the benefit of customer 106. The offers include, but are not limited to, special discounts on particular services, free subscription to particular services, faster response to the request made by customer 106 and so forth. One or more offers are can be purchased through web-based system 102. In another embodiment of the invention, customer 206 may be required to pay an additional amount to purchase the special service package. Further, customer 106 may need to pay a certain amount on a regular basis.

In an embodiment of the invention, web page 202 displays a site locator 314, which provides an option to customers 106 to obtain maps and directions for locations of service and sales centers of the company. Map function 124 helps in generating maps of these locations. Customers 106 may obtain directions to the nearest service and sales center according to his/her location.

In an embodiment of the invention, web page 202 displays a register online 316, which enables customer 106 to create a customer login name to interact with customer service center 104 through web page 202. For creating the customer login name, web page 202 displays a registration form. Customer 106 then fills in the registration form to create the customer login name. The customer login name is allocated by customer service center 104 to customers 106 and is unique for each of customers 106 who have registered through web page 202. Customer 106 interacts with web-based system 102 using the customer login name, wherein web page 202 displays the various modes of contact available for customer 106 to contact customer service center 104, on web portal 118, along with the information related to each mode of contact. Examples of such information may be telephone numbers, chat IDs, email addresses, Internet talk IDs, estimated wait time for one or more modes of contact, less busy times for one or more modes of contact, estimated response time for one or more modes of contact, estimated resolution time for one or more modes of contact, and so forth.

In an embodiment of the invention, web page 202 displays a define-query 318. Define-query 318 enables customer 106 to define a query accurately for faster resolution through web-based system 102. Customer 106 enters the query through web page 202 by selecting define-query 318. The query may be relating to a particular product or service provided by the company. Web page 202 displays query-defining options to customer 106. Examples of query-defining options include, but are not limited to, options describing different engagement stages such as 'After buying a product online', 'After shipment', 'After receipt', 'On installation and commissioning', 'On integration with other devices', 'On initial usage', 'On matured usage' and so forth. Customer 106 may select one of the query-defining options. Further, on selection of any one of the query-defining options, web page 202 may display sub-query-defining options on web page 202 for customer 106 to define the query precisely. In another embodiment of the invention, web page 202 displays problem capture forms for helping customer 106 to define a query accurately. Customer 106 fills in the details asked by the problem capture forms through web page 202. The details may include, but are not limited to, personal information, questions having more than one query-defining option and so forth. Personal information may include, but is not limited to, name of the customer, contact number of the customer, customer login name, and so forth.

In an embodiment of the invention, web page 202 displays a purchase-related-query 320. Purchase-related-query 320 enables customer 106 to obtain a solution to a problem through web-based system 102. Customer 106 enters the problem through web page 202. The problem may be related to a product purchased or a service availed by customer 106. Web page 202 displays one or more solutions to the problem entered by customer 106. If the one or more solutions displayed on web page 202 do not solve the problem of customer 106, then customer 106 may ask for further assistance through web page 202. On asking for further assistance, web page 202 may provide alternative ways for contacting customer service center 104. The alternative ways may include, but are not limited to, establishing contact through various modes of contact such as call, chat, email, Internet talk, IVR, and so forth.

Figure 4A:
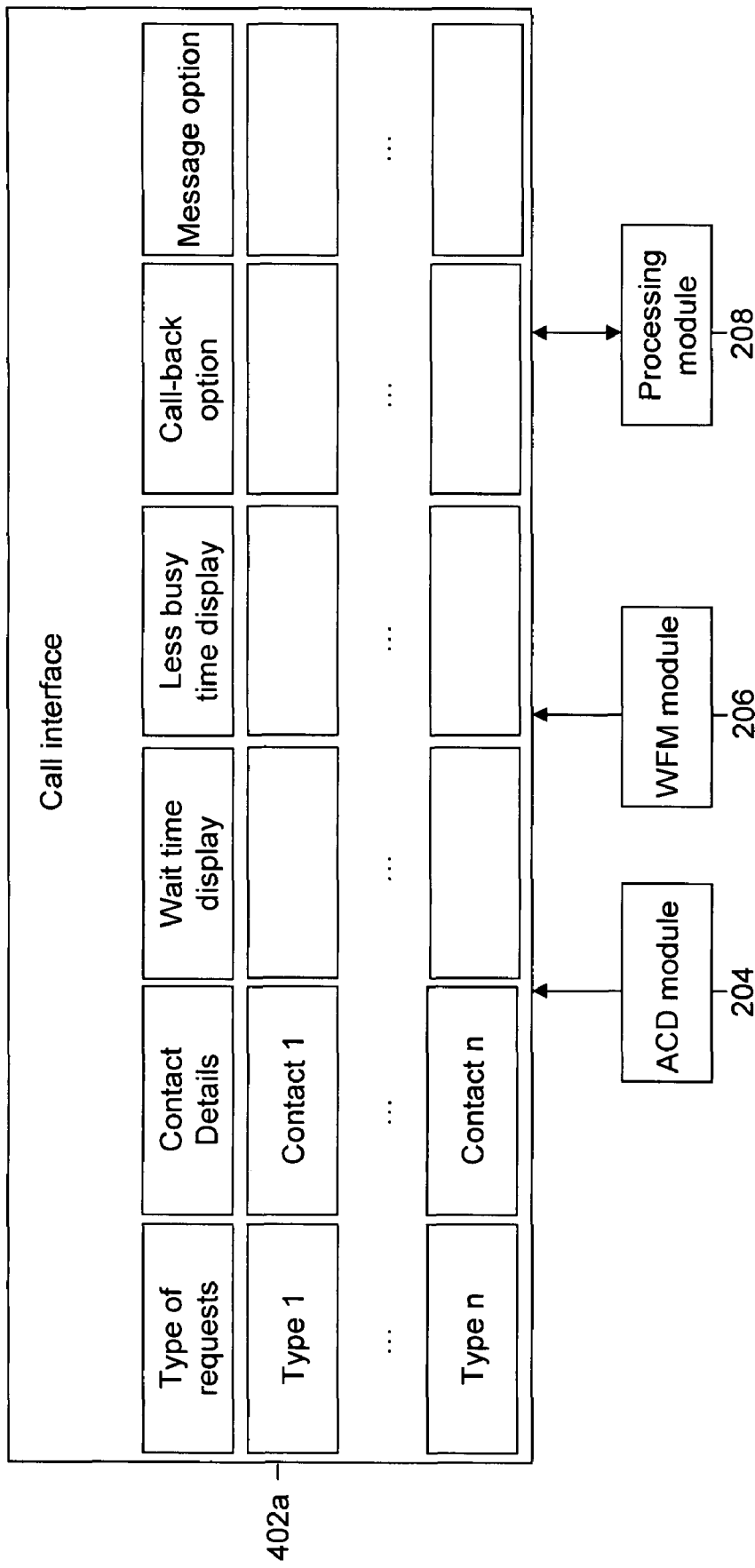
FIG. 4a illustrates a call interface provided by the web page, in accordance with an embodiment of the invention.

FIG. 4a illustrates a call interface 402a, in accordance with an embodiment of the invention. According to an embodiment of the invention, if customer 106 selects call option 302, web page 202 displays call interface 402a that includes a contact list displaying contact numbers corresponding to a particular type of request. In an embodiment of the invention, web page 202 displays call interface 402a that includes a contact list displaying contact numbers corresponding to the geographical location. In an embodiment of the invention, web page 202 displays call interface 402a that includes a contact list displaying contact numbers corresponding to a particular product or service provided by the company. In an embodiment of the invention, web page 202 displays toll-free contact numbers corresponding to a particular type of request, geographical location, or a particular product or service provided by the company. When customer 106 makes a call at a toll-free contact number, customer 106 does not have to pay to corresponding service provider of the telephone service for making the call.

In an embodiment of the invention, web page 202 displays the estimated wait time corresponding to the contact numbers provided in the contact list. ACD 108 computes the estimated wait time for each contact number and provides it to web page 202, through ACD module 204.

In an embodiment of the invention, web page 202 displays the less busy time that corresponds to the contact numbers provided in the contact list. WFM system 112 computes the less busy time for each contact number and provides it to web page 202, through WFM module 206.

In an embodiment of the invention, web page 202 displays an IVR contact number, corresponding to the contact numbers provided in the contact list. Customer 106 dials the IVR contact number through a telephone to interact with a computer database of the customer service center 104. The computer database provides automated responses to the requests made by customer 106 through IVR system 109. The computer database uses a voice browser of IVR system 109 to identify customer 106 requests and thereby, generate a suitable automated response. In an embodiment of the invention, if the computer database is unable to resolve the request made by customer 106 in a certain period of time, IVR system 109 transfers the telephone call of customer 106 to a customer service representative of customer service center 104. The customer service representative then attends to customer 106 and serves the request or resolves the query.

In another embodiment of the invention, when customer 106 dials the contact number through a telephone provided on web page 202, a contact is established between customer 106 and a computer database through IVR system 109. The computer database provides automated responses to the requests made by customer 106 through IVR system 109. The computer database uses a voice browser of IVR system 109 to identify customer 106 requests and thereby, generate a suitable automated response. In an embodiment of the invention, if the computer database is unable to resolve the request made by customer 106 within a certain period of time, IVR system 109 transfers the telephone call of customer 106 to a customer service representative of customer service center 104. The customer service representative then attends to customer 106 and serves the request or resolves the query.

In an embodiment of the invention, web page 202 displays a key sequence, corresponding to the contact numbers provided in the contact list. Customer 106 may dial in the key sequence through a telephone to directly reach a customer service representative of customer service center 104. By dialing the key sequence through the telephone, customer 106 may circumvent listening to the instructions provided by a pre-recorded message for selecting different options over the telephone.

In an embodiment of the invention, web page 202 displays a call-back option, corresponding to the contact numbers provided in the contact list. Customer 106 places a call back request through web page 202 displaying the call-back option. The call-back option provides customer 106 an interface to place the call back request by selecting the queue according to the type of request made by customer 106. In an embodiment of the invention, if customer 106 selects the call-back option on call interface 402*a*, a customer data collection screen corresponding to the call-back option is displayed, described in conjunction with FIG. 2.

In yet another embodiment of the invention, web page 202 displays a message service option. The message service option is for placing a message request, as described in conjunction with FIG. 2. The message service option provides a message that updates customer 106 regarding the estimated wait time for a selected queue. The message may include, but is not limited to, a text message, a multimedia message and so forth. In an embodiment of the invention, if customer 106 selects the message service option on call interface 402*a*, a customer data collection screen corresponding to the message service option is displayed, as described in conjunction with FIG. 2.

Figure 4B:
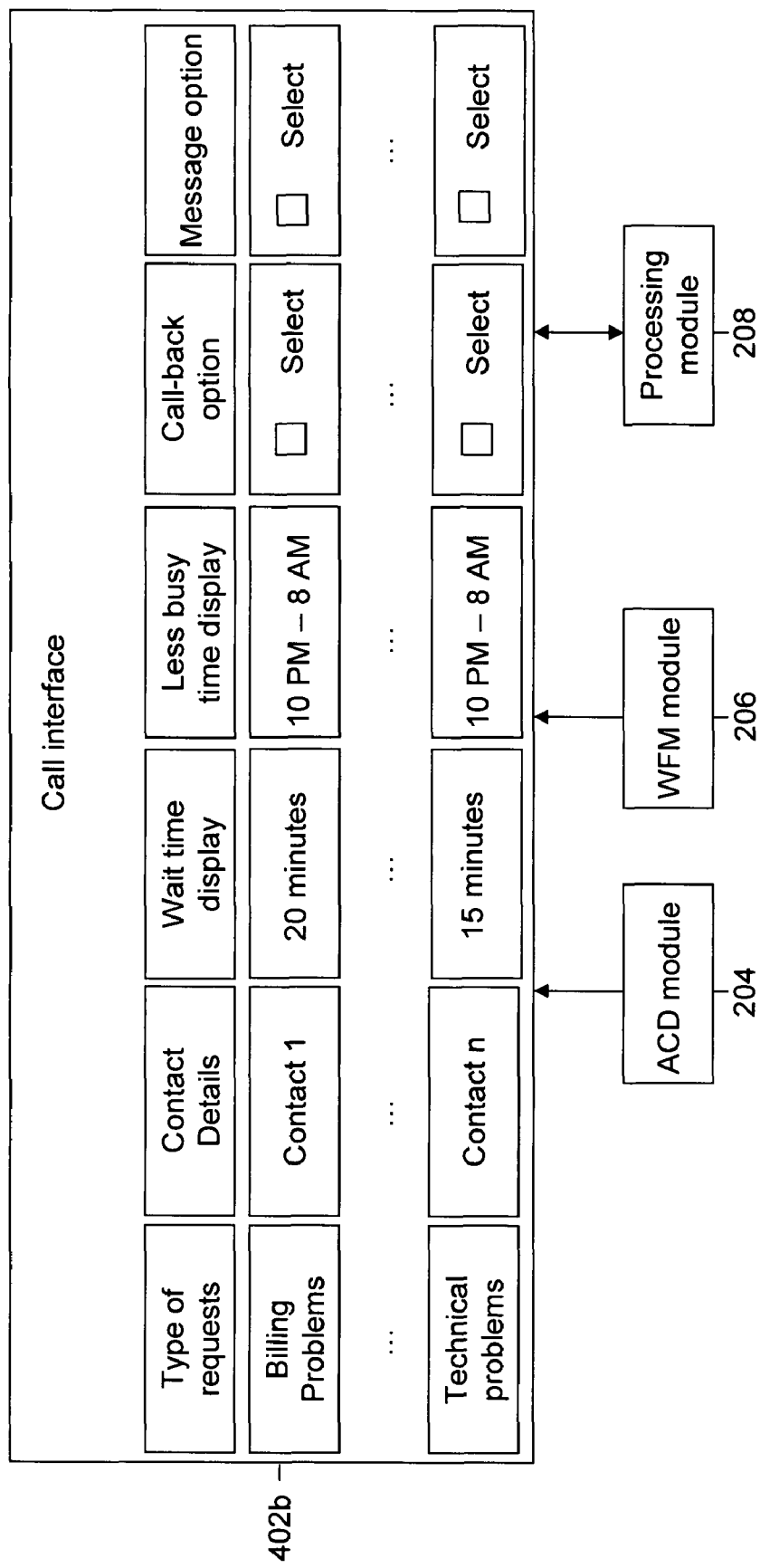
FIG. 4b illustrates an example of a call interface, in accordance with an embodiment of the invention.

FIG. 4*b* illustrates an example of a call interface 402*b*. Example of call interface 402*b* includes a contact list displaying contact details for different types of requests, geographical locations or a particular product or service provided by the company. For example, the contact details for placing requests related to billing problems are provided on web page. Example of call interface 402*b* further displays the corresponding estimated wait time and the less busy time for the queue relating it to billing problems. In an embodiment of the invention, the estimated wait time displayed corresponding to the queue relating to billing problems is 20 minutes and the less busy time is from 10 PM to 8 AM (PST, Pacific Standard Time). Further, example of call interface 402*b* displays a call-back option and a message option. A customer may select the option to use the call back and message services for a particular type of request.

Figure 5A:
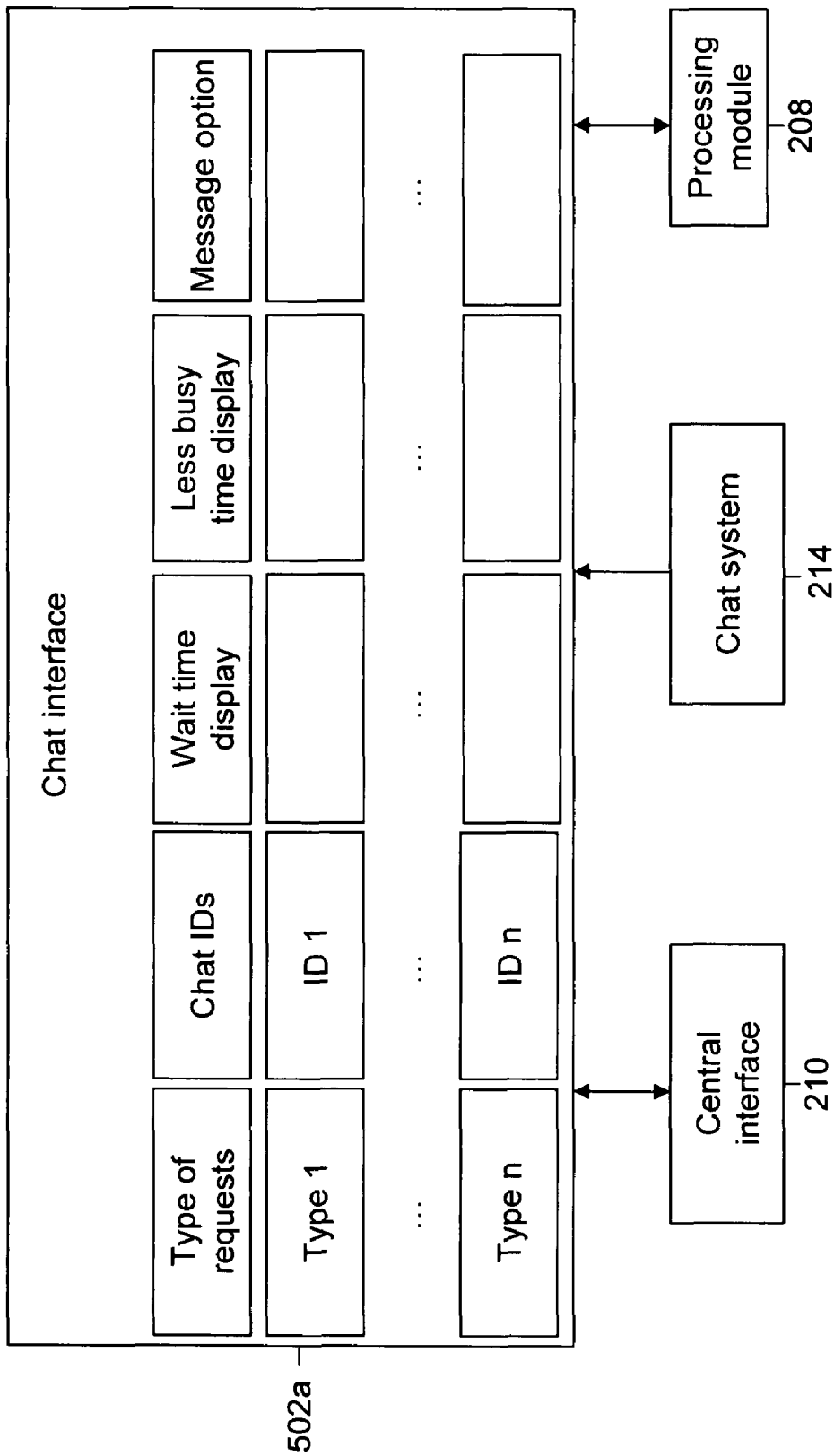
FIG. 5a illustrates a chat interface provided by the web page, in accordance with an embodiment of the invention.

FIG. 5*a* illustrates a chat interface 502*a*, in accordance with an embodiment of the invention. According to an embodiment of the invention, if customer 106 selects chat option 304, web page 202 provides chat interface 502*a* that displays a list of chat IDs, categorized on the basis of the type of requests. Each chat ID is provided with a link to initiate the chat with a customer service representative available from a group of customer service representatives that handle the corresponding type of request. In an embodiment of the invention, each chat ID is provided with a link to initiate the chat with an auto-customer service representative. When customer 106 places a request or asks a query, the auto-customer service representative generates an automated response based on text entered by customer 106 through chat interface 502*a*. The text entered by customer 106 is read by the auto-customer service representative through chat system 214. Chat system 214 is capable of auto text recognition. Chat system 214 compares the text recognized with general queries and requests stored in knowledge database 116. If the text matches a particular query or request, knowledge database 116 provides a corresponding automated response to chat system 214. Chat system 214 provides the automated response to customer 106 through chat interface 502*a*.

In an embodiment of the invention, as customer 106 tries to resolve a query or make a request by establishing a chat with an auto-customer service representative, escalation system 224 keeps a track of the time spent by customer 106 in trying to resolve a query by establishing a chat with the auto-customer service representative. If the time spent by customer 106 exceeds a particular threshold time, escalation system 224 provides an option to customer 106 to establish contact through other modes of contact. The other modes of contact may resolve the query. The other modes of contact include, but are not limited to, call, chat, email, Internet talk, IVR and so forth. For example, a customer tries to resolve a query relating to a product feature by establishing a chat with an auto-customer service representative through chat interface 502*a*, but is unable to do so within 30 minutes. Escalation system 224 provides an option to the customer to establish contact through another mode of contacts like a call with a customer service representative, Internet talk with a customer service representative etc.

In an embodiment of the invention, when customer 106 has established contact with a customer service representative through chat interface 502*a*, the customer service representative co-browses web page 202 with customer 106. Chat system 214 enables the customer service representative to browse web page 202 along with customer 106. In an embodiment of the invention, a customer service representative fills in a form displayed on web page 202 along with customer 106 using chat system 214. The customer service representative may transfer the control entirely, for filling in the details of specific fields of the form, to customer 106 through chat system 214. The details of the specific fields of the form may be confidential and thus should be known only to customer 106. Examples of the specific fields of the form include, but are not limited to, passwords, transaction login name and password while making online payments, and so forth.

Central interface 210 provides an interface between web page 202 displaying chat IDs and web-based applications 114. Examples of the web-based applications 114 for contacting the customer service representatives through chat include, but are not limited to, Yahoo!® chat, MSN® messenger, AOL®, Rediff® chat, and so forth.

In an embodiment of the invention, when customer 106 initiates the chat with the customer service representative, web page 202 displays an option to select other modes of contact for interacting with the customer service representative at the same time. The other modes of contact include, but are not limited to, Internet talk, email and so forth. Customer 106 upon selecting at least one from the other modes of contact can interact with the customer service representative through the selected mode of contact at the same time.

In an embodiment of the invention, when customer 106 wants to schedule a chat to place a particular type of request, customer 106 selects a link corresponding to the type of request customer 106 wants to place. Web page 202 displays a request form for the chat. Customer 106 provides a chat ID, through which customer 106 wants to be contacted by customer service center 104, through the request form. Further, customer 106 mentions a specified time frame within which a customer service representative handling the stated type of request may initiate the chat with customer 106. As soon as a customer service representative handling the stated type of request is available, the customer service representative initiates the chat with customer 106.

In an embodiment of the invention, web page 202 displays the estimated wait time corresponding to the chat IDs provided on chat interface 502a. The estimated wait time is provided by chat system 214.

In an embodiment of the invention, web page 202 displays the less busy time corresponding to the chat IDs provided on chat interface 502a. The less busy time is provided by chat system 214.

In an embodiment of the invention, web page 202 displays a message service option. The message service option is for placing a message request, as described in conjunction with FIG. 2. The message service option provides a message to update customer 106 regarding the estimated wait time for a selected queue. The message includes, but is not limited to, a text message, a multimedia message and so forth. In an embodiment of the invention, if customer 106 selects the message service option on chat interface 502a, a customer data collection screen corresponding to the message service option is displayed, described in conjunction with FIG. 2.

Figure 5B:
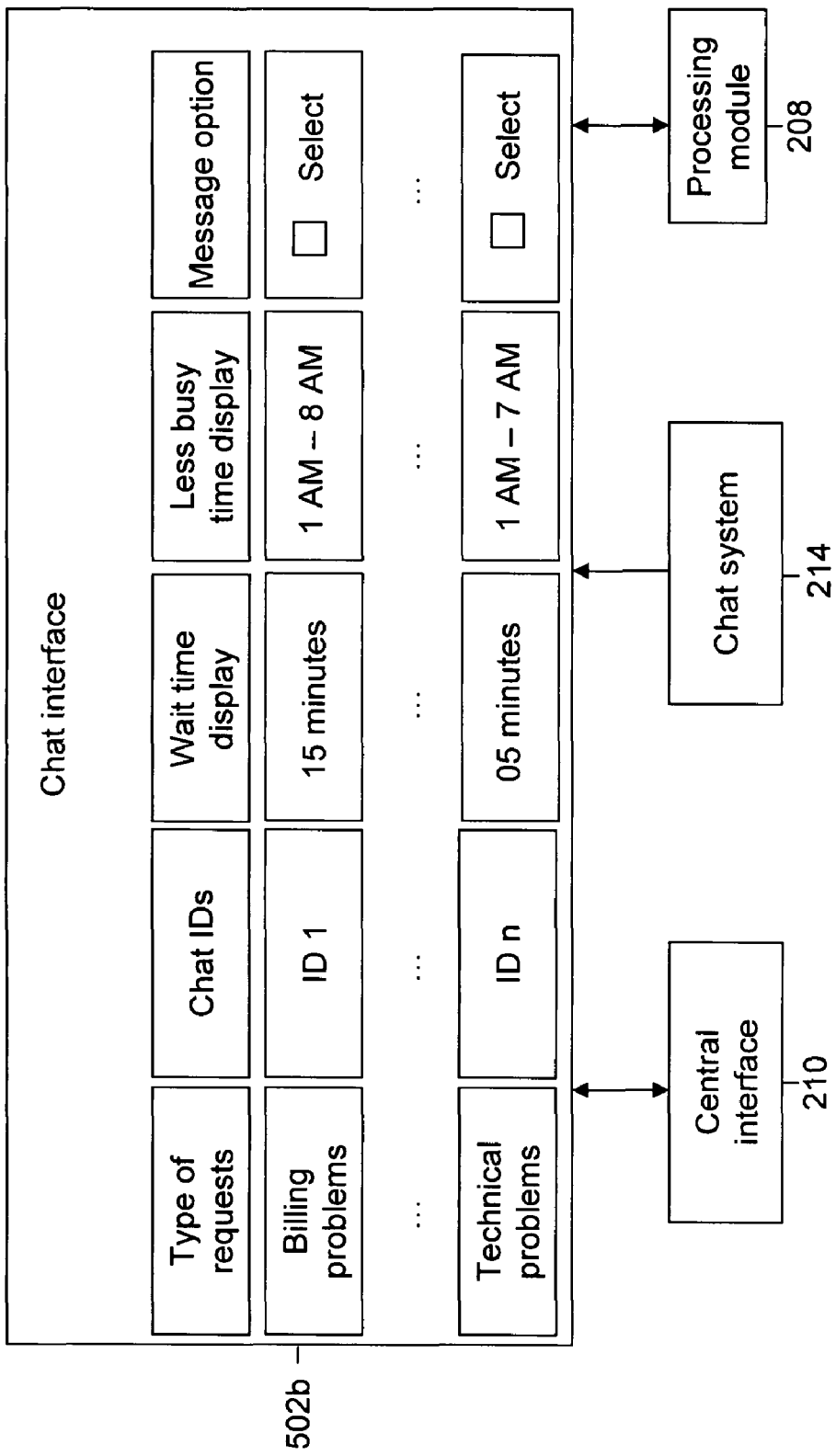
FIG. 5b illustrates an example of a chat interface, in accordance with an embodiment of the invention.

FIG. 5b illustrates an example of a chat interface 502b. Example of chat interface 502b displays the list of chat IDs categorized on the basis of type of requests. The list of chat IDs displays the chat IDs corresponding to particular types of requests with corresponding links to initiate the chat. Web page displays a chat ID for placing a request related to billing problems. Further, example of chat interface 502b displays the estimated wait time and the less busy time corresponding to the type of request. In an embodiment of the invention, the estimated wait time displayed is 15 minutes and the less busy time is from 1 AM to 8 AM (PCT). In addition, when a customer initiates the chat with the customer service representative, the web page displays an option to select other modes of contact for interacting with the customer service representative at the same time. The modes of contact include, but are not limited to, Internet talk, email and so forth. The customer upon selecting at least one among the other modes of contact can interact with the customer service representative through the selected mode of contact at the same time. Example of chat interface 502b further displays an SMS option. A customer may select a chat ID corresponding to the type of request to avail the message service, using the message service option.

Figure 6A:
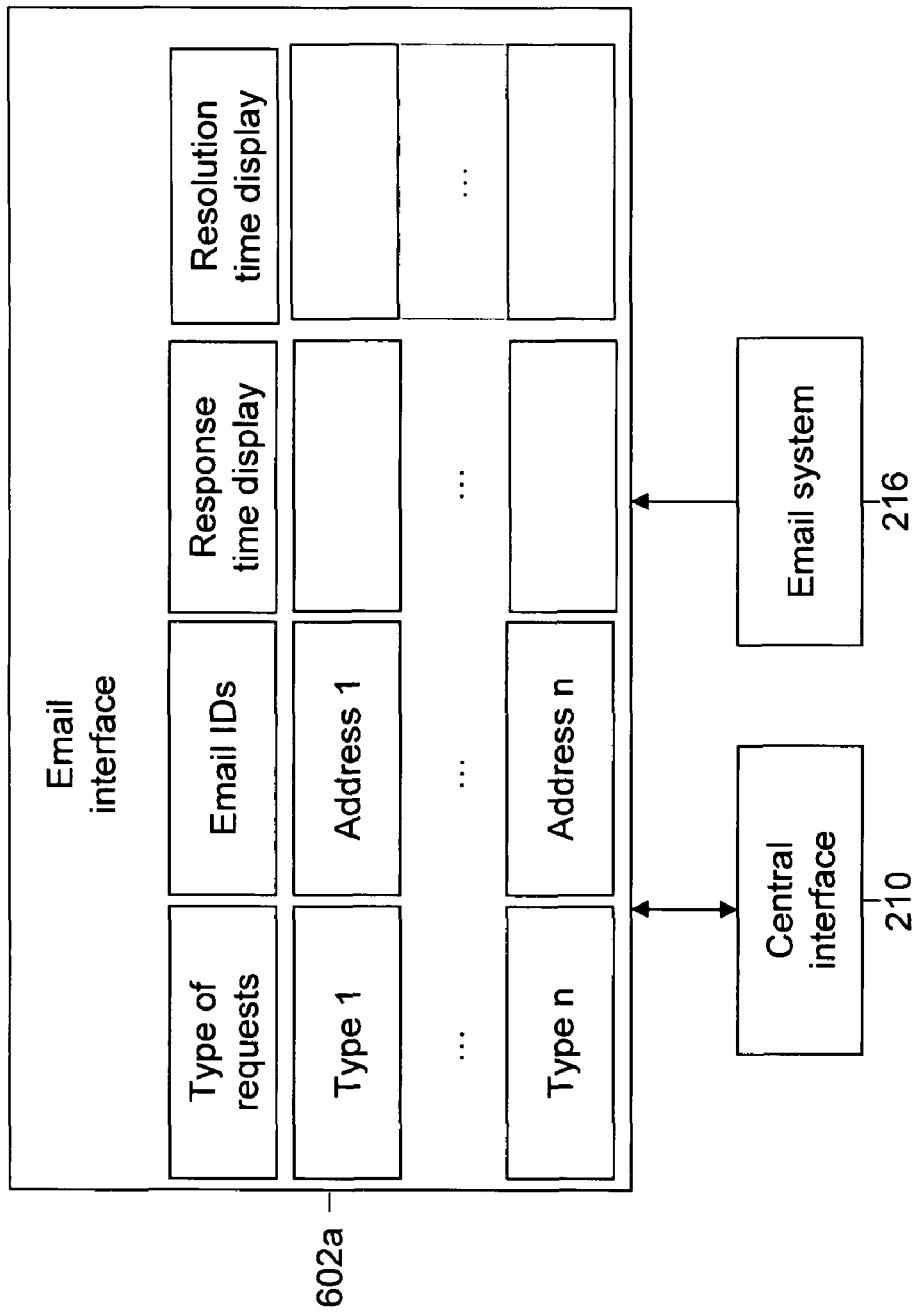
FIG. 6a illustrates an email interface provided by the web page, in accordance with an embodiment of the invention.

FIG. 6a illustrates an email interface 602a, in accordance with an embodiment of the invention. If customer 106 selects email option 306, web page 202 provides email interface 602a that displays a list of email addresses categorized on the basis of the type of requests. Central interface 210 provides an interface between web page 202 displaying the list of email addresses and web-based applications 114. Customer 106 may send a request through an email. In another embodiment of the invention, links are provided corresponding to each email address in the list of email addresses displayed on web page 202. Customer 106 may send a request by selecting a link corresponding to a particular email address based on the type of request. In an embodiment of the invention, web page 202 displays a customer data collection screen corresponding to the email address selected. Customer 106 provides personal information through the customer data collection screen. The personal information includes, but is not limited to, name, email address, contact number of customer 106 and so forth. Customer service center 104 sends a response corresponding to the request made by customer 106 to the email address of customer 106. However, customer 106 may ask for a response through an email or a message. The message includes, but is not limited to, a text message, a multimedia message and so forth. In another embodiment of the invention, email interface 602a displays the estimated response time and the estimated resolution time corresponding to the email IDs. The displayed estimated response time provides the time required by customer service center 104 to respond to customer 106. The displayed estimated response time provides the time required by customer service center 104 to resolve the query or serve the request made by customer 106. The estimated response time and the estimated resolution time are provided by email system 216.

Figure 6B:
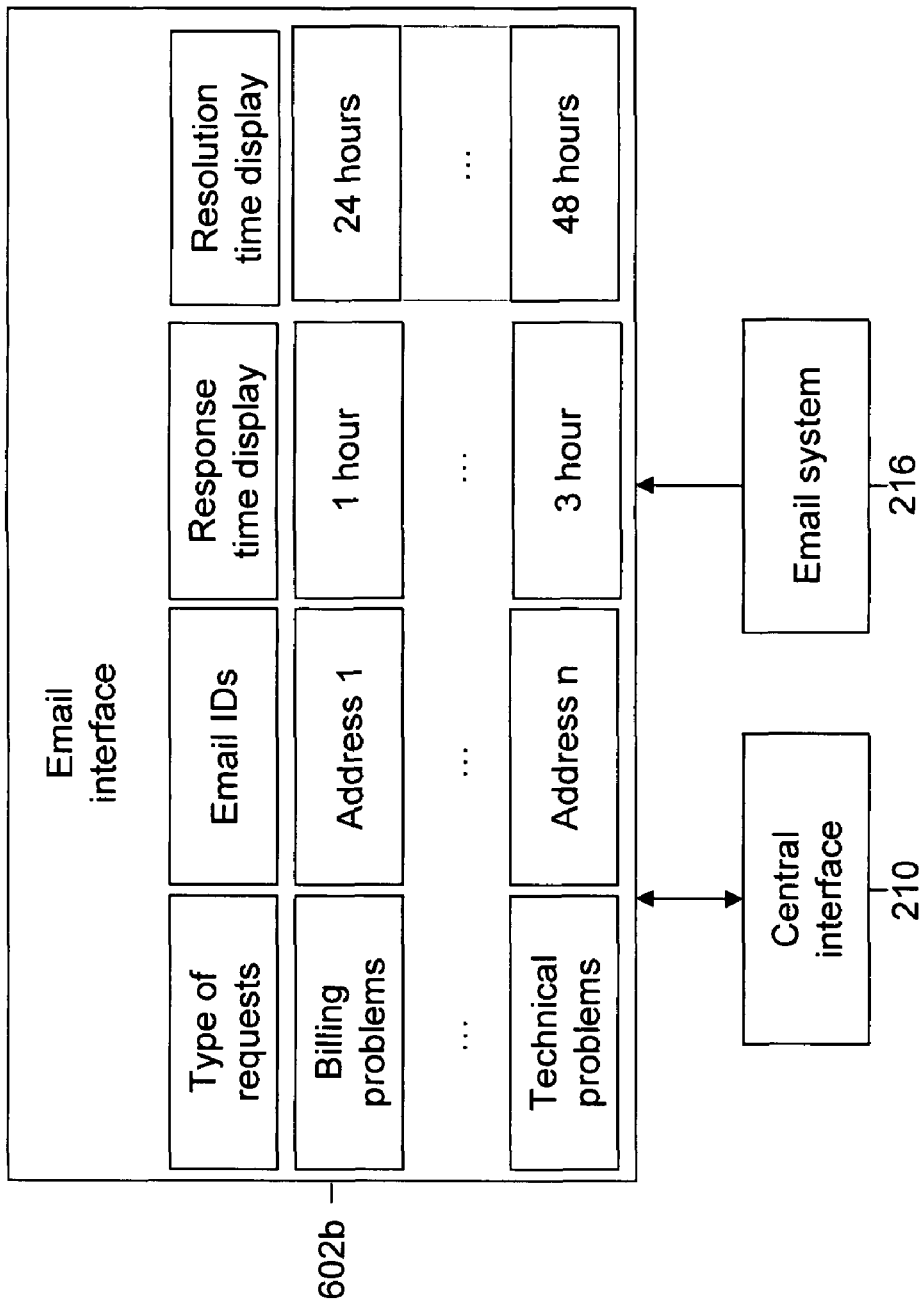
FIG. 6b illustrates an example of an email interface, in accordance with an embodiment of the invention.

FIG. 6b illustrates an example of an email interface 602b, which displays a list of email IDs categorized on the basis of type of requests. In the example of email interface 602b, Address 1 is an email address for placing requests related to billing problems. In an embodiment of the invention, the corresponding estimated response time and estimated resolution time for Address 1 displayed on email interface 602b is one hour.

Figure 7A:
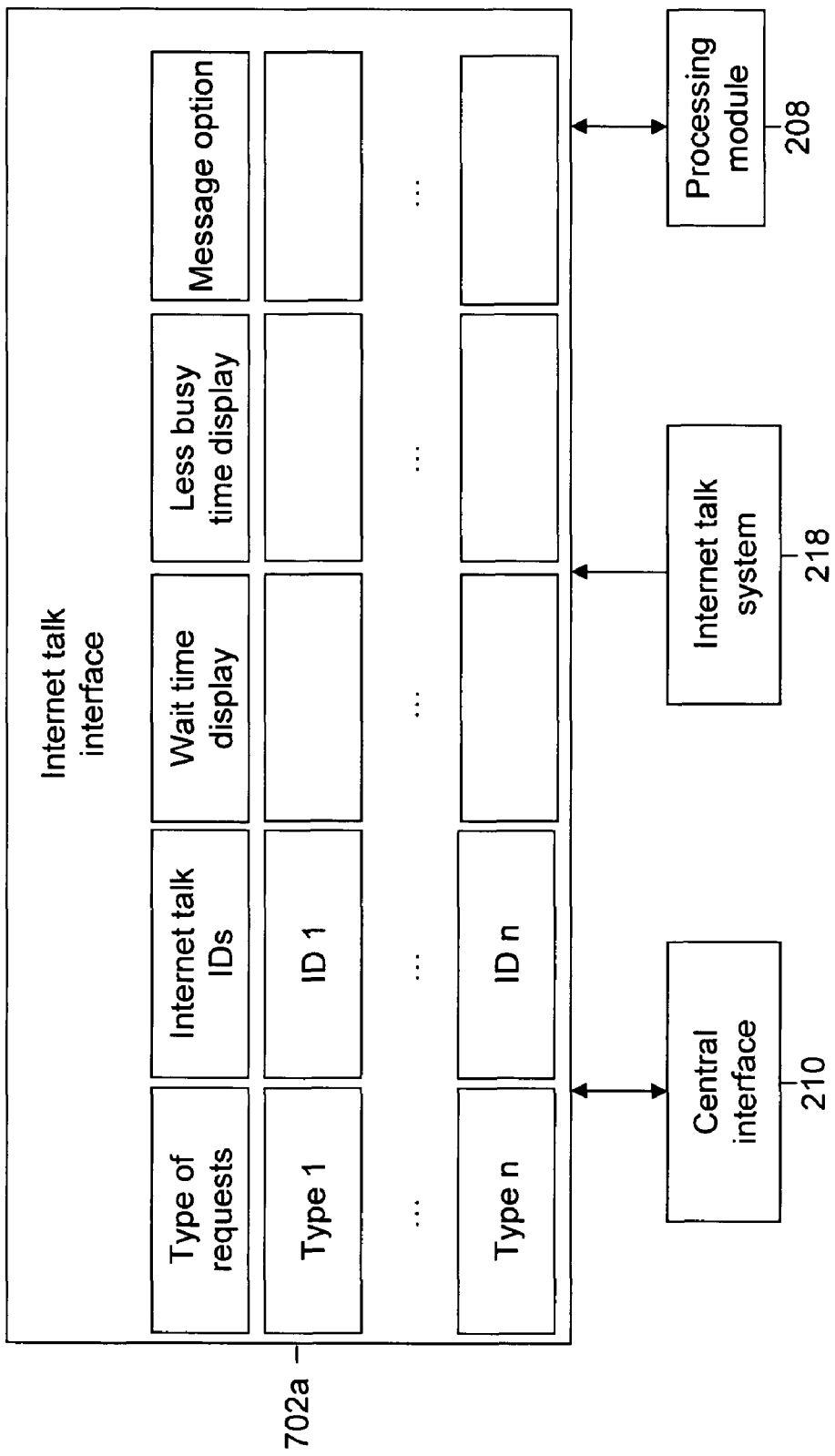
FIG. 7a illustrates an Internet talk interface provided by the web page, in accordance with an embodiment of the invention.

FIG. 7a illustrates an Internet talk interface 702a, in accordance with an embodiment of the invention. According to an embodiment of the invention, if customer 106 selects Internet talk option 308, web page 202 provides Internet talk interface 702a that displays a list of Internet talk IDs categorized on the basis of the type of requests. Each Internet talk ID is provided with a link to initiate an Internet talk with the corresponding customer service representative. When customer 106 wants to place a particular type of request, customer 106 may initiate the Internet talk with the customer service representative by selecting the link corresponding to the type of request. When customer 106 initiates the Internet talk with the customer service representative, web page 202 displays an option to select other modes of contact for interacting with the customer service representative at the same time. The modes of contact include, but are not limited to, chat, email and so forth. Customer 106 upon selecting at least one from the other modes of contact can interact with the customer service representative through the selected mode of contact at the same time.

In an embodiment of the invention, when customer 106 wants to schedule an Internet talk to place a particular type of request, customer 106 selects a link corresponding to the type of request. Web page 202 displays a request form for an Internet talk. Customer 106 provides an Internet talk ID, through which customer 106 wishes to be contacted by customer service center 104, through the request form. Further, customer 106 may mention a specified time frame within which a customer service representative handling the stated type of request may initiate the Internet talk with customer 106. As soon as a customer service representative handling the stated type of request is available, the customer service representative initiates the Internet talk with customer 106.

In an embodiment of the invention, each Internet talk ID is provided with a link to initiate an Internet talk with an auto-customer service representative. When customer 106 places a request or asks a query, the auto-customer service representative generates an automated voice response based on the request or the query recognized by interpreting the voice of customer 106. Internet talk system 218 interprets the voice of customer 106. Internet talk system 218 is capable of voice recognition. Internet talk system 218 compares the interpreted voice with general queries and requests stored in knowledge database 116 to obtain the most likely request or query being said by customer 106. If the interpreted voice matches a particular query or request, knowledge database 116 provides a corresponding automated response to Internet talk system 218. Internet talk system 218 provides the automated response to customer 106 through Internet talk interface 702*a*.

In an embodiment of the invention, customer 106 tries to resolve a query by establishing an Internet talk with an auto-customer service representative, escalation system 224 keeps track of the time spent by customer 106 in trying to resolve a query by establishing an Internet talk with the auto-customer service representative. If the time spent by customer 106 exceeds a particular threshold time, escalation system 224 will provide an option to customer 106 to establish contact through other modes of contact. The other modes of contact may resolve the query. The other modes of contact includes, but is not limited to, call, chat, email, Internet talk, IVR and so forth. For example, a customer tries to resolve a query relating to a product feature by establishing an Internet talk with an auto-customer service representative through Internet talk interface 702*a*, but is unable to do so within 30 minutes. Escalation system 224 provides an option to the customer to establish contact through another mode of contacts like a call with a customer service representative, to establish the Internet talk with a customer service representative, to chat with a customer service representative and so forth.

In an embodiment of the invention, when customer 106 has established contact with a customer service representative through Internet talk interface 702*a*, the customer service representative selects an option to co-browse web page 202 with customer 106. Internet talk system 218 enables the customer service representative to browse web page 202 along with customer 106. In an embodiment of the invention, Internet talk system 218 enables a customer service representative to fill in a form displayed on web page 202 along with customer 106. Internet talk system 218 further enables the customer service representative to transfer the control entirely, for filling in the details of specific fields of the form, to customer 106. The details of the specific fields of the form may be confidential and thus should be known only to customer 106. Examples of the specific fields of the form include, but are not limited to, passwords, transaction login name and password while making online payments, and so forth.

Central interface 210 provides an interface between web page 202 displaying the list of Internet talk IDs and web-based applications 114. Web-based applications 114 include, but are not limited to, Yahoo!® chat with voice application, Google® talk, and the like.

In an embodiment of the invention, Internet talk interface 702*a* displays the estimated wait time corresponding to the list of Internet talk IDs. In an embodiment of the invention, web page 202 displays the less busy time corresponding to the list of Internet talk IDs. Internet talk system 218 provides the corresponding estimated wait time and the less busy time.

In an embodiment of the invention, web page 202 displays a message service option. The message service option is for placing a message request, as described in conjunction with FIG. 2. The message service option provides a message to update customer 106 regarding the estimated wait time for a selected queue. The message may include, but is not limited to, a text message, a multimedia message and so forth. In an embodiment of the invention, if customer 106 selects the message service option on Internet talk interface 702*a*, a customer data collection screen corresponding to the message service option is displayed, as described in conjunction with FIG. 2.

Figure 7B:
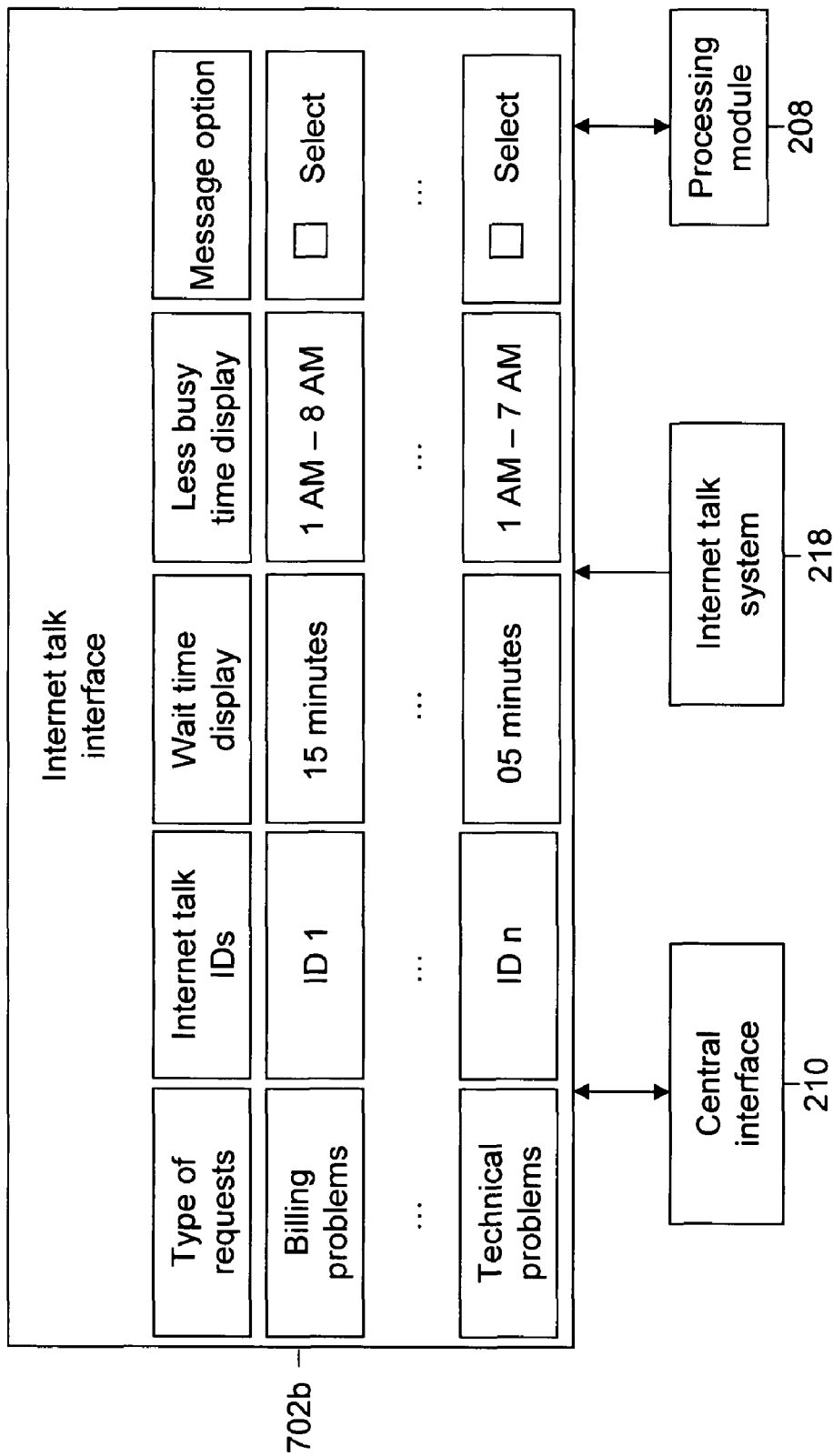
FIG. 7b illustrates an example of an Internet talk interface, in accordance with an embodiment of the invention.

FIG. 7*b* illustrates an example of an Internet talk interface 702*b*. Internet talk interface 702*b* displays the list of Internet talk IDs categorized on the basis of the type of requests. For example, the Internet talk ID for placing requests related to billing problems is displayed on Internet talk interface 702*b*. Internet talk interface 702*b* displays corresponding estimated wait time and less busy time for each Internet talk ID. In an embodiment of the invention, the estimated wait time displayed is 15 minutes and the less busy time is from 1 to 8 AM (PCT). Further, Internet talk interface 702*b* displays a message service option.

Figure 8:
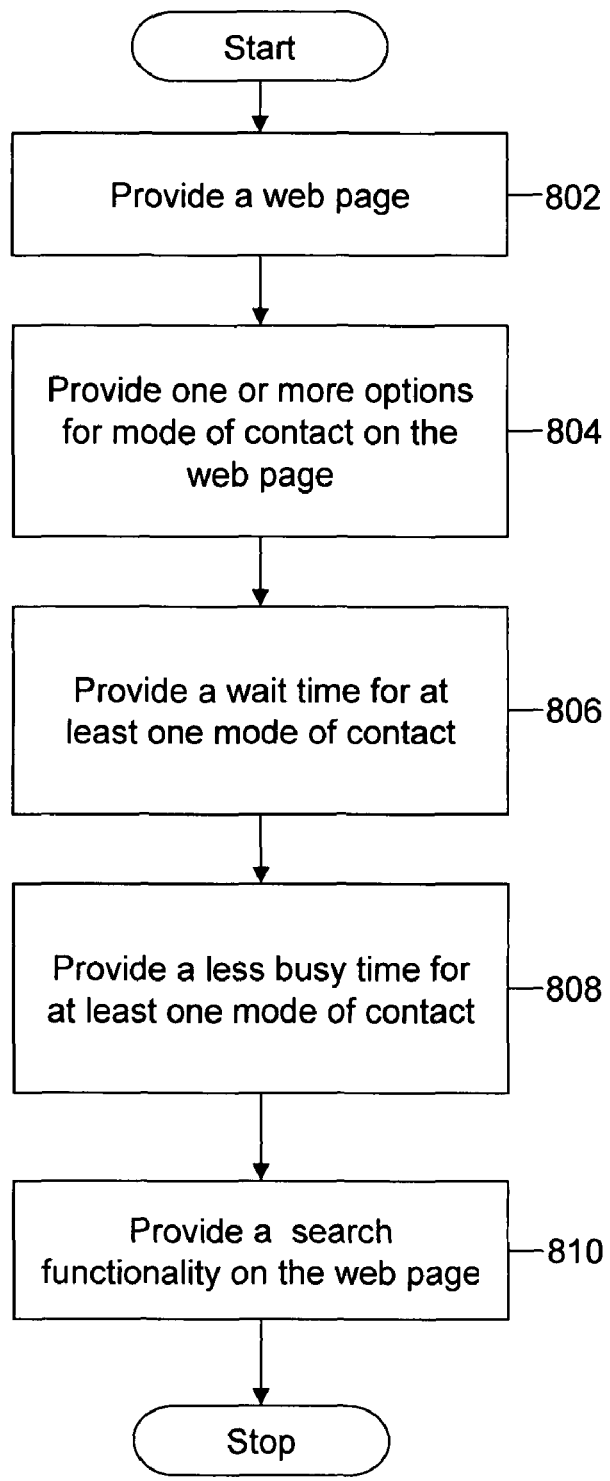
FIG. 8 is a flowchart, illustrating a method for providing assistance to a customer, in accordance with an embodiment of the invention.
Figure 9A:
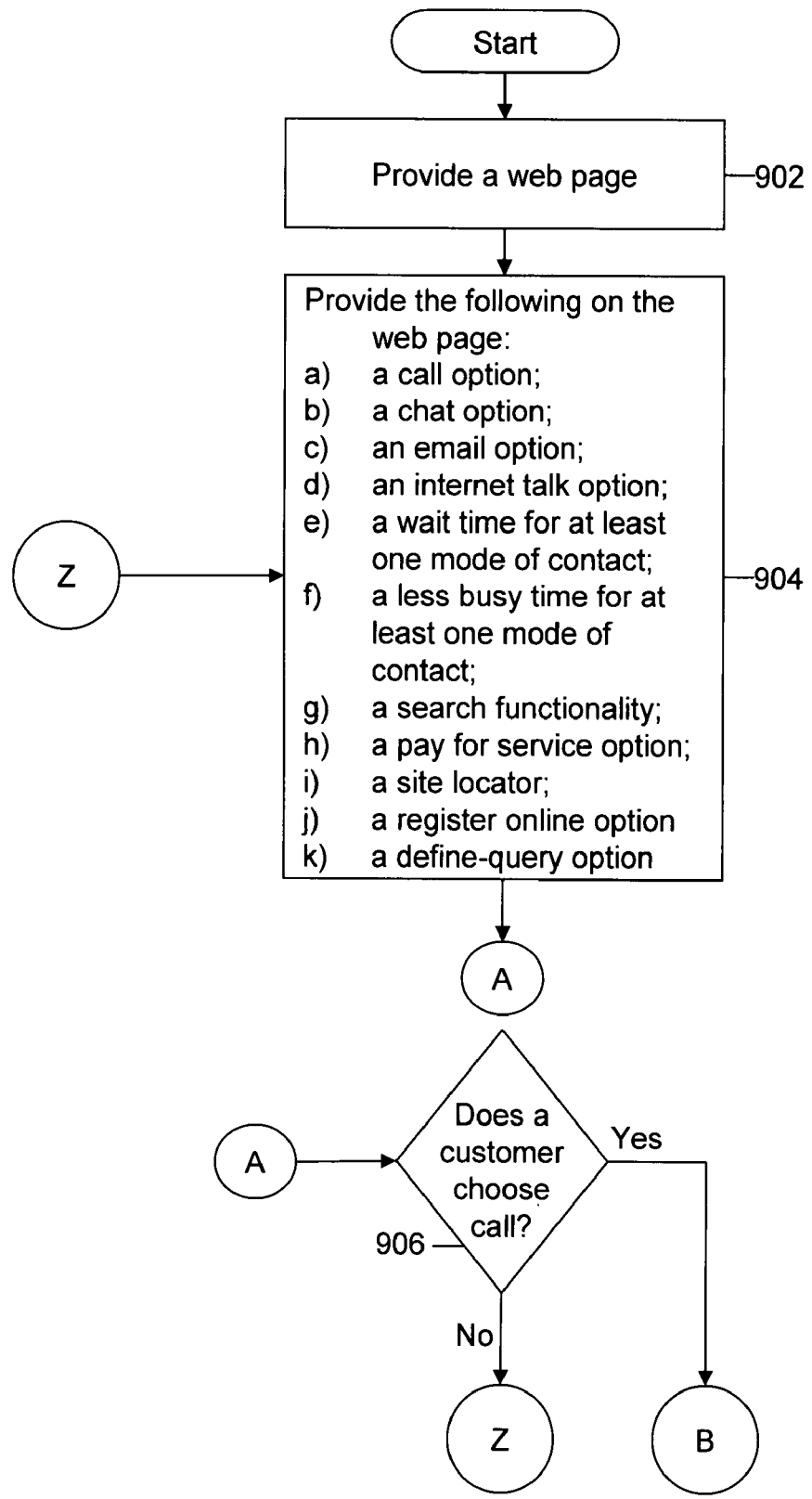
FIGS. 9a, 9b, 9c, 9d, 9e, and 9f illustrate a flowchart that presents a method for providing assistance to a customer, in accordance with another embodiment of the invention.
Figure 9B:
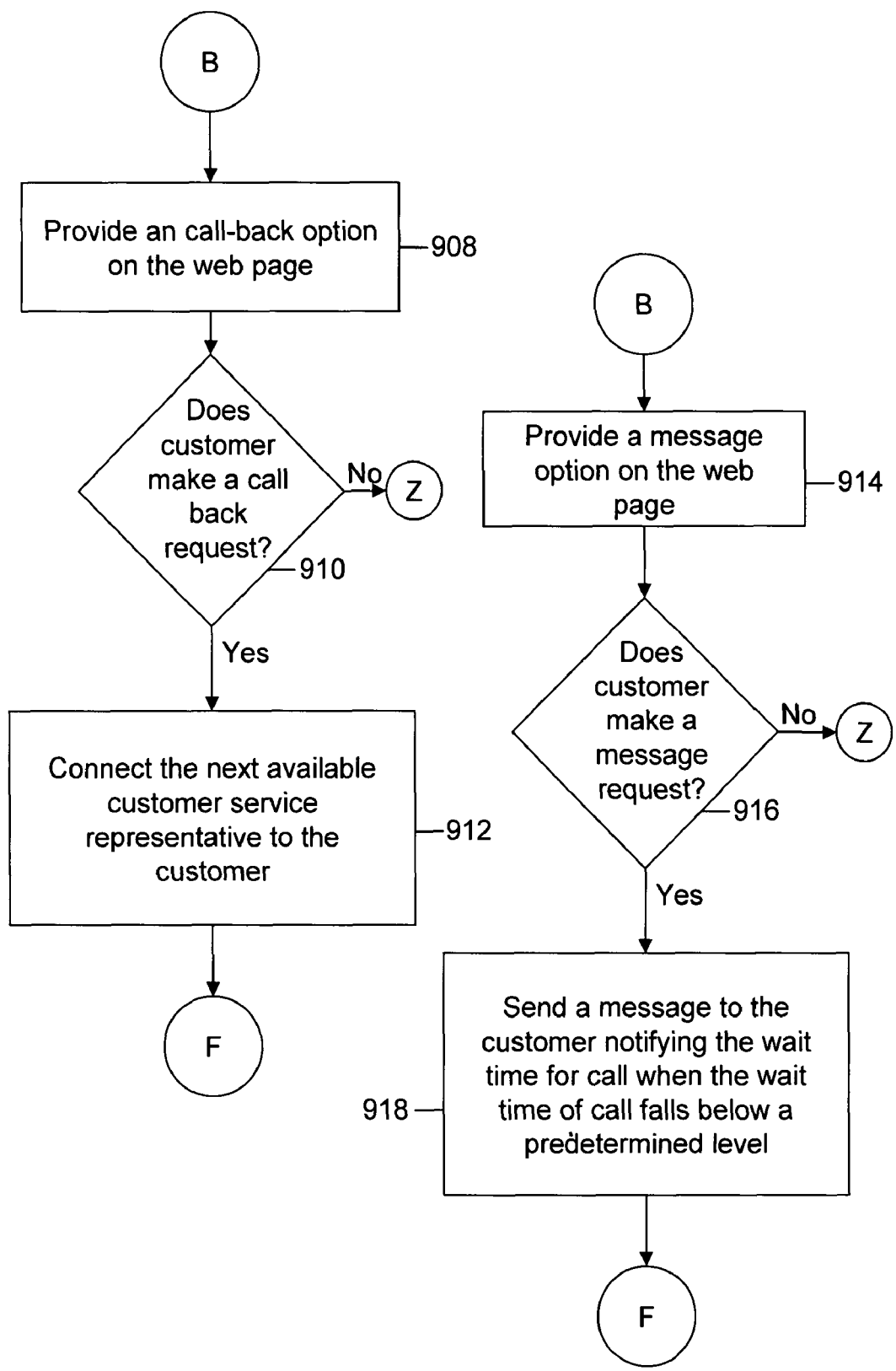
Figure 9C:
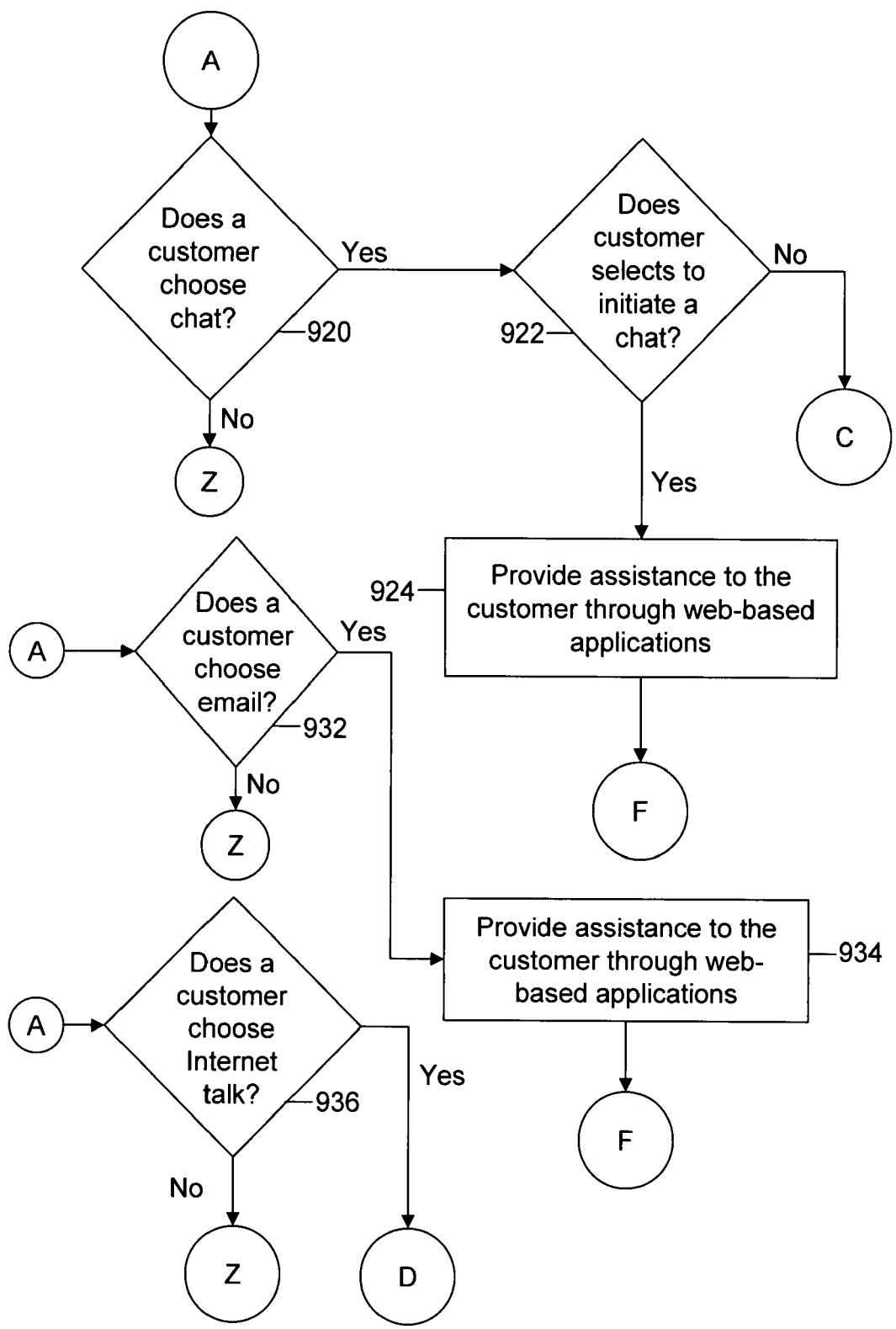
Figure 9D:
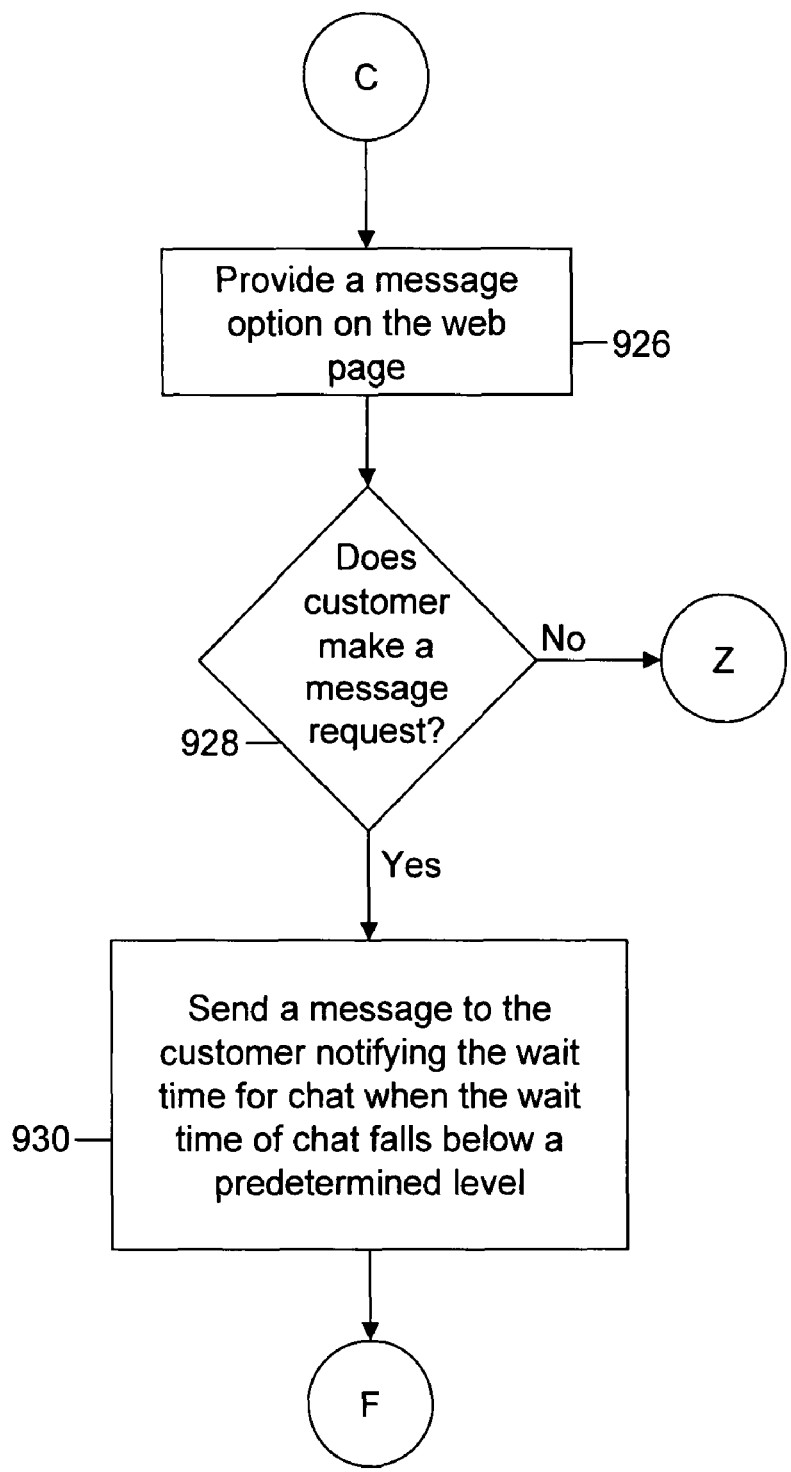
Figure 9E:
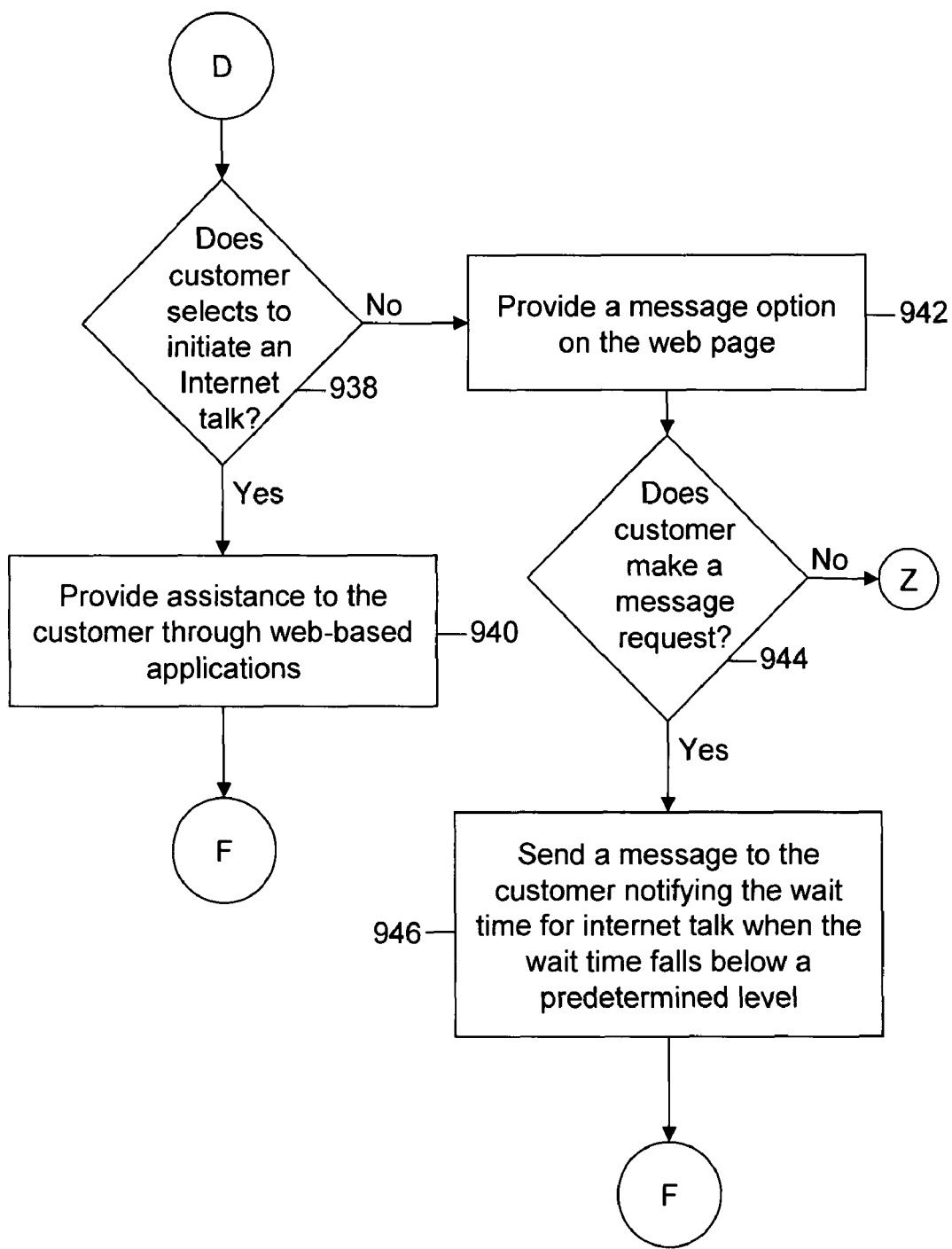
Figure 9F:
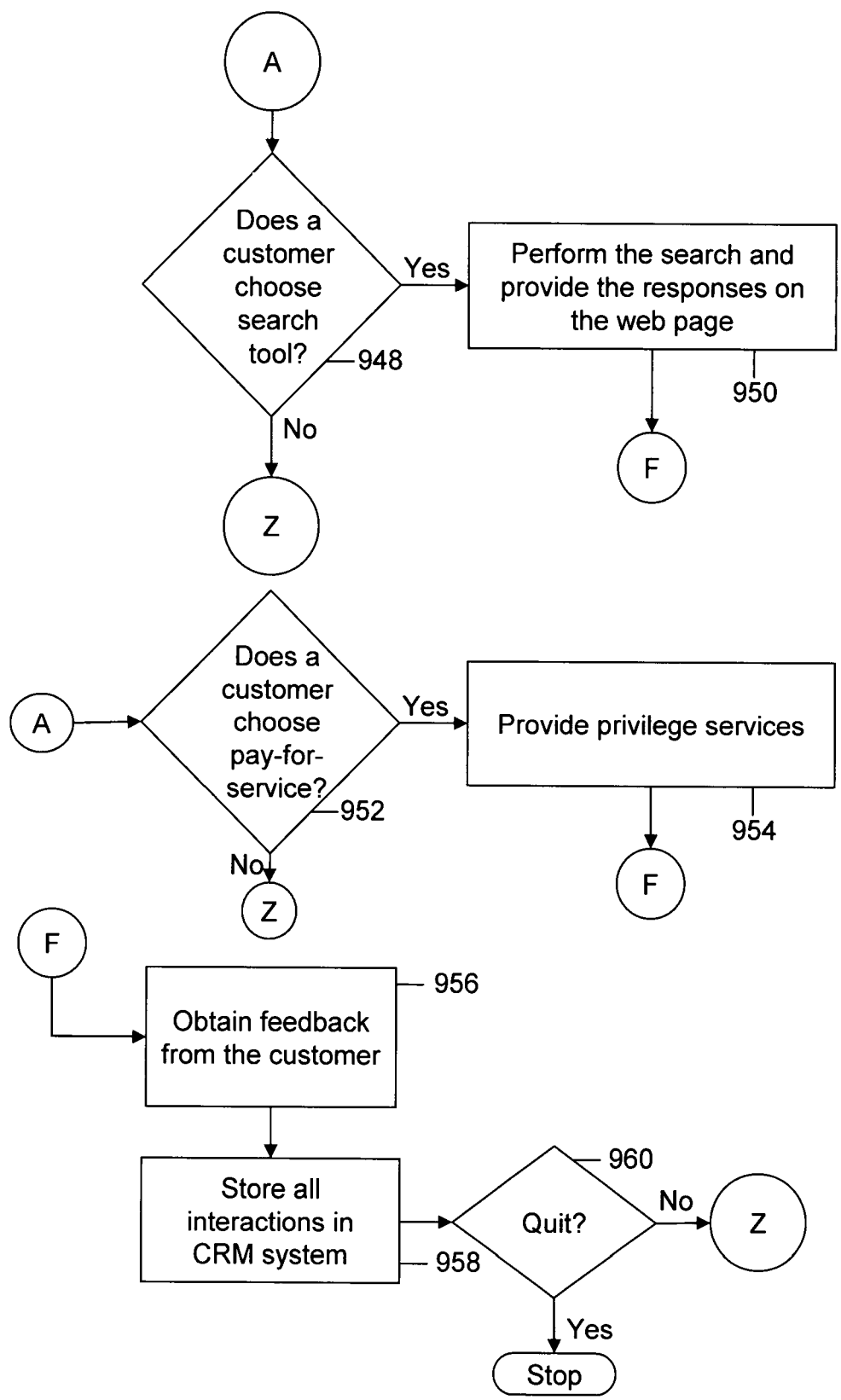

FIG. 8 is a flowchart, illustrating a method for interacting and providing assistance to customers, in accordance with an embodiment of the invention. At step 802, a web page is provided to a customer through a company's web portal. The customer interacts with a customer service center of the company through the web page. At step 804, one or more options are provided on the web page. The one or more options signify different modes for establishing contact between the customer and the customer service center. The modes of contact include, but are not limited to, chat, call, email, Internet talk, and so forth. The call mode of contact includes details for establishing contact through IVR. A central interface acts as an interface between the web page and the web-based applications, to establish contact between the customer and the customer service center. The customer can make a request through at least one of the modes of contact provided by the central interface. This request is sent to the customer service center. A customer service representative at the customer service center responds and provides assistance through the mode of contact the customer has used to contact the customer service center. However, according to an embodiment of the invention, if a customer uses email as a mode of contact to place a request, the customer may ask for a response through a message, instead of an email. The message may include, but is not limited to, a text message, a multimedia message, and so forth.

At step 806, the estimated wait time is provided for at least one of the modes of contact on the web page. The estimated wait time for call is provided by an ACD on a real-time basis. An ACD module provides the interface between the web page and the ACD. The estimated wait times for other modes of contact, i.e., chat and Internet talk are provided by a chat system and an Internet talk system, respectively. Further, estimated response time and estimated resolution time is provided for email, mode of contact, on the web page. The estimated response time refers to the time the customer has to wait until he/she receives a response from the customer service center. The estimated resolution time refers to the time the customer has to wait until the request/query made by the customer is resolved by the customer service center. The estimated response time and the estimated resolution time is provided by an email system.

At step 808, a less busy time is provided for at least one mode of contact on the web page. The less busy time is provided by a WFM system for call, a mode of contact, on real-time basis. A WFM module provides an interface between the web page and the WFM system. The less busy times for other modes of contact such as chat, Internet talk are provided by the chat system, and the Internet talk system, respectively. At step 810, a knowledge database search option is provided on the web page to conduct a search in a knowledge database. The search is conducted with the help of a search tool. The search tool is interfaced with the web page. A query to be searched is entered by the customer through the web page. A search for the query is conducted in the knowledge database, and an automated response for the query is displayed on the web page. Along with the automated response, a list of the modes of contact arranged on the basis of the estimated wait times for the modes of contact and the nature of the query is displayed on the web page.

FIGS. 9*a*, 9*b*, 9*c*, 9*d*, 9*e* and 9*f* illustrate a flowchart of a method for interacting and providing assistance to customers, in accordance with another embodiment of the invention. At step 902, a web page is provided to a customer through a web portal of the company. The customer interacts with a customer service center through the web page.

At step 904, one or more options for displaying the various modes of contact are provided on the web page. The one or more options for signifying the modes of contact include, but are not limited to, a call option, a chat option, an email option and an Internet talk option. A central interface provides an interface between the web page and web-based applications. The web-based applications are used for establishing contact between the customer and the customer service center. Further, an estimated wait time for at least one mode of contact is provided on the web page. The estimated wait time for the call is provided by an ACD on a real-time basis. An ACD module provides the interface between the web page and the ACD. The estimated wait times for other modes of contact, i.e., chat, and Internet talk are provided for a chat system, and an Internet talk system, respectively. Further, an estimated response time and estimated resolution time is provided for email, mode of contact, on the web page. The estimated response time refers to the time the customer has to wait until he/she receives a response from the customer service center. The estimated resolution time refers to the time the customer has to wait until the request/query made by the customer is resolved by the customer service center. The estimated response time and the estimated resolution time is provided by an email system.

In addition, a less busy time for at least one mode of contact is provided on the web page. The less busy time for call, a mode of contact, is provided by a WFM system on real-time basis. A WFM module provides an interface between the web page and the WFM system. The less busy times for other modes of contact, i.e., chat, and Internet talk are provided by the chat system, and the Internet talk system, respectively. Further, a knowledge database search option is provided on the web page to conduct a search in a knowledge database. The search for a query made by the customer is conducted with the help of a search tool. This search tool is interfaced with the web page through which the query is entered. In addition, a pay-for-service option is provided on the web page along with an option to locate the nearest service and sales center. Maps or directions may be retrieved for a location through a map function.

In an embodiment of the invention, a register online option is provided on the web page to the customer. The customer may create a customer login name to interact with the customer service center through the web page by selecting the register online option. On selecting the register online option, a registration form is displayed on the web page. The registration form is filled in by the customer to obtain the customer login name. The customer login name is allocated by the customer service center and is unique for all the customers who register through the web page. The customer interacts with the customer service center using the customer login name through the web page.

In an embodiment of the invention, a define-query option is displayed by the web page. The customer service center helps the customer to define a query through the web page. The query is entered by the customer through the web page on selecting the define-query option. The query may be related to a particular product or service provided by the company. The customer is helped by the customer service center in defining the query by selecting one of the query-defining options displayed on the web page. Examples of query-defining options include, but are not be limited to, options describing different engagement stages such as 'After buying a product online', 'After shipment', 'After Receipt', 'On installation and commissioning', 'On integration with other devices', 'On initial usage', 'On matured usage' and so forth. Further, on selecting any one of the query-defining options, sub-query-defining options may be displayed on the web page for customer to define the problem precisely. In another embodiment of the invention, on selecting the define-query option, problem capture forms are displayed on the web page. Details asked by the problem capture forms are entered by the customer through the web page. The details may include, but are not limited to, personal information, questions having more than one query-defining option and so forth. Personal information may include, but is not limited to, name of the customer, contact number of the customer, customer login name, and so forth. In an embodiment of the invention, when the customer makes a request or asks a query through the web page, a ticket management system assigns a ticket number to the request made or query asked by the customer.

In an embodiment of the invention, a purchase-related-query option is displayed on the web page. The customer service center helps the customer to obtain a solution to a problem through the purchase-related-query option displayed on the web page. The problem is entered by the customer through the web page. The problem may be related to a product purchased or a service availed by the customer. One or more solutions to the problem entered by the customer are displayed on the web page. If the one or more solutions displayed on the web page do not solve the problem of the customer, then further assistance may be provided to the customer through the web page. On asking for further assistance by the customer, alternative ways for contacting the customer service center are displayed on the web page. The alternative ways may include, but are not limited to, establishing contact through various modes of contact such as call, chat, email, Internet talk, IVR, and so forth.

In another embodiment of the invention, when the customer makes a transaction through the web page, the ticket management system assigns a ticket number to the transaction. Examples of transaction include, but are not limited to, buying a product online, making online payments for shipping of a product and so forth. The customer may use the ticket number as reference to keep a track on status of the request, the query or the transaction made through the web page. The status may provide information relating to the state of the request or the query. Examples of status include 'request submitted', 'request closed', 'request active', 'request to be served on Nov. 10, 2006' and so forth. In an embodiment of the invention, upon request from the customer, alert messages corresponding to a particular ticket number is sent by the customer service center. Examples of the alert messages are, but not limited to, email alert messages, alert messages through a dedicated alert system, messages on hand-held devices, messages through web portal and so forth. Examples of hand-held devices include, but are not limited to, mobile phones, PDAs, and so forth.

In an embodiment of the invention, when a request made or a query asked by the customer through the web page requires an offline activity to be performed, a pre-defined process is initiated by a workflow-based resolution system corresponding to the request or the query. A ticket number is assigned to the request or the query by the ticket management system. The pre-defined process includes a set of activities to be performed by one or more task owners. The one or more task owners include, but are not limited to, automated systems, customer service representatives, employees of other companies and so forth. Status of the request or the query corresponding to the ticket number can be viewed by the customer through the web page. The status may provide information relating to the state of the request or the query. Examples of status are 'request submitted', 'request closed', 'request active', 'request to be served on Nov. 10, 2006' and so forth. The status of the activities performed is updated by the task owner through the workflow-based resolution system. In an embodiment of the invention, if the task owner is an automated system, an auto-update is made through the workflow-based resolution system. In an embodiment of the invention, if the task owner is a customer service representative or an employee of another company, the update is made manually by the task owner through the workflow-based resolution system.

In another embodiment of the invention, alerts are generated by the workflow-based resolution system regarding the completion of the activities performed by one or more task owners. The alerts are sent to the customer through one or more channels. The channels include, but are not limited to, call, text message, multimedia message, email, pre-recorded voice message and so forth.

At step 906, the customer is given an option to select a call option. The call option provides a call interface wherein a list of contact numbers is categorized on the basis of type of request is displayed. In an embodiment of the invention, the call option provides a call interface wherein a list of contact numbers is categorized on the basis of geographical location. In an embodiment of the invention, the call option provides a call interface wherein a list of contact numbers is categorized on the basis of a particular product or service provided by the company. The customer may make a request to the customer service center by placing a call through a contact number displayed on the web page. In an embodiment of the invention, toll-free contact numbers, corresponding to a particular type of request, geographical location, or a particular product or service provided by the company, are displayed on the call interface. When the customer calls a toll-free contact number, the customer does not have to pay to provider of the telephone service for making the call.

In another embodiment of the invention, an IVR contact number is displayed on the call interface, corresponding to the contact numbers provided in the contact list. The customer dials the IVR contact number through a telephone to interact with an auto-customer service representative of the customer service center. The contact is established between the customer and the auto-customer service representative through an IVR system. The auto-customer service representative is controlled by a computer database that provides automated responses to the requests made by the customer. For identifying the customer's requests, a voice browser of the IVR system is used by the computer database and thereby, a suitable automates response is generated. In an embodiment of the invention, if the computer database is unable to resolve the request made by the customer in a certain period of time, the telephone call of the customer is transferred to a customer service representative of the customer service center by the IVR system. The request or the query of the customer is then served by the customer service representative.

In yet another embodiment of the invention, when the customer dials the contact number through a telephone provided on the call interface, the customer is connected to an auto-customer service representative. The contact is established between the customer and the auto-customer service representative through an IVR system. The auto-customer service representative is controlled by a computer database that provides automated responses to the requests made by the customer. For identifying the customer's requests, a voice browser of the IVR system is used by the computer database and thereby, a suitable automates response is generated. In an embodiment of the invention, if the computer database is unable to resolve the request made by the customer, the telephone call of the customer is transferred to a customer service representative of the customer service center by the IVR system. The request or the query of the customer is then served by the customer service representative.

In an embodiment of the invention, a key sequence is displayed on the call interface, corresponding to the contact numbers provided in the contact list or corresponding to a particular type of request, is displayed on the call interface. The customer may dial in the key sequence through a telephone to directly reach a customer service representative of the customer service center. By dialing the key sequence through the telephone, customer 106 may circumvent listening to the instructions provided by a pre-recorded message for select different options for reaching different services over the telephone. Different services include, but are not limited to, talking to a customer service representative, and so forth.

At step 906, if the customer selects the call option, a call-back option corresponding to the contact numbers is provided on the call interface at step 908 and a message service option is provided at step 914. At step 910, the customer is given an option to place a call back request by selecting the call-back option for a queue corresponding to a type of request provided on the call interface. Along with selecting the call-back option, the customer fills a customer data collection screen that is displayed on the web page. The data entered by the customer is stored in a processing module. The data is further sent to the ACD through the processing module. The customer would receive a call back as soon as a customer service representative corresponding to the type of request is available. At step 912, the next available customer service representative handling the selected queue is connected to the customers through the ACD. The available customer service representatives are connected to the customers through the ACD in the order in which the ACD receives the call back requests. If the customer does not select the call-back option at step 910, the customer is redirected to step 904.

At step 914, a message service option corresponding to the contact numbers is provided on the call interface. At step 916, the customer is given an option to select the message service option for a queue corresponding to a type of request through the call interface. Along with selecting the message service option, the customer fills a customer data collection screen displayed on the web page. The data entered by the customer is stored in the processing module. If the customer selects the message service option at step 916 and fills the customer data collection screen, a message is sent by the processing module when the estimated wait time of the selected queue falls below a predetermined value of estimated wait time within the specified time frame to the customer, at step 918. The processing module sends the message to a message web gateway. The message is sent through the message web gateway to a network service provider through the Internet. The network service provider, in turn, delivers the message to the customer. The customer receives a notification regarding the estimated wait time through the message. In case the estimated wait time of the queue never falls below the predetermined value, a message notifies the customer to call, stating that the estimated wait time never falls below the predetermined value within the time frame and recommending other suitable times, with lower estimated wait time to the customer. The message may include, but is not limited to, a text message, multimedia message, and so forth. If the customer does not select the message service option at step 916, the customer is redirected to step 904.

At step 920, the customer is given an option to select the chat option. The chat option provides a chat interface, wherein a list of chat IDs is categorized on the basis of the type of request. In an embodiment of the invention, the estimated wait time corresponding to the chat IDs is displayed on the chat interface. The estimated wait time is provided by a chat system. In an embodiment of the invention, the less busy time corresponding to the chat IDs is displayed on the chat interface. The less busy time is provided by the chat system. Estimated wait time refers to the time a customer has to wait until he/she obtains a response from a customer service representative through chat. Less busy time signifies the time during the day when the number of requests received by the customer service center, in proportion to the staffing levels, is less compared to the number of requests received at other times.

If the customer selects the chat option at step 920, then, at step 922, the customer is given an option to initiate and place a request through chat with a customer service representative at the customer service center by selecting a link corresponding to a chat ID provided on the chat interface. If the customer does not select the chat option at step 920, the customer is redirected to step 904. At step 924, if the customer chooses to initiate and place a request through chat, the customer is provided assistance by the customer service representative through chat. The web page is connected to web-based applications through the central interface. The contact through chat, between the customer and the customer service center, is established through web-based applications. A few examples of web-based applications are, Yahoo!® chat, MSN® messenger, AOL®, and Rediff® chat. In an embodiment of the invention, each chat ID is provided with a link to initiate the chat with an auto-customer service representative. When the customer places a request or asks a query, an automated response is generated by the auto-customer service representative based on text entered by the customer through the chat interface. The text entered by the customer is interpreted by the auto-customer service representative, which is controlled by a chat system. The chat system is capable of auto text recognition. The text entered by the customer is compared with general queries and requests stored in the knowledge database. If the text matches a particular query or request, an automated response corresponding to the query or request is provided by the knowledge database to the chat system. The automated response is provided to the customer through the chat interface by the chat system.

In an embodiment of the invention, a track of the time spent by the customer in trying to resolve a query via a chat with auto-customer service representative is kept by an escalation system. If the time spent by the customer exceeds a particular threshold time, an option is provided by the escalation system to the customer to establish contact through other modes of contact. The other modes of contact may resolve the query. The other modes of contact include, but are not limited to, call, chat, email, Internet talk, IVR and so forth.

In an embodiment of the invention, when the customer initiates a chat with the customer service representative, the customer is provided an option to select other modes of contact to interact with the customer service representative at the same time. The other modes of contact include, but are not limited to, email and Internet talk.

In an embodiment of the invention, the customer service representative is provided an option for co-browsing with the customer. On selecting the option, the customer service representative browses the web page along with the customer. In an embodiment of the invention, the chat system enables a customer service representative to fill in a form displayed on the web page along with customer. The control to fill in the form may be entirely transferred to the customer by the customer service representative through the chat system for filling in the details of specific fields of the form. The details of the specific fields of the form may be confidential and should be known only to the customer. Examples of the specific fields of the form include, but are not limited to, passwords, transaction login name and password while making online payments, and so forth.

In an embodiment of the invention, the customer is provided an option to schedule a chat for a queue corresponding to a chat ID displayed on the chat interface. On selecting the option to schedule a chat, the customer is provided a customer data collection screen on the chat interface. The customer fills the customer data collection screen displayed on the chat interface. If the customer does not choose to initiate and place a request through chat at step 924, a message service option is provided on the chat interface corresponding to the chat IDs at step 926. At step 928, the customer is given an option to select the message service option for a queue corresponding to a chat ID displayed on the chat interface. Along with selecting the message service option, the customer fills a customer data collection screen displayed on the chat interface. The data entered by the customer is stored in the processing module, which keeps a track of the queue. At step 930, if the customer selects the message service option, a message is sent when the estimated wait time of the chat falls below a predetermined value of estimated wait time within the specified time frame to the customer. The processing module sends the message to the message web gateway. The message is sent through the message web gateway to the network service provider through the Internet. The network service provider, in turn, delivers the message to the customer. The customer receives a notification regarding the estimated wait time through the message. In case the estimated wait time of the queue never falls below the predetermined value, a message is sent to the customer, notifying that the estimated wait time never falls below the predetermined value within the said time frame and recommending the customer other times, with lower estimated wait time for chatting. The message includes, but is not limited to, a text message, multimedia message, and so forth. If the customer does not select the message service option at step 930, the customer is redirected to step 904.

At step 932, the customer is given the option to select the email option. The email option provides an email interface, wherein a list of email addresses is categorized on the basis of the type of request, geographical location or product/service on to the web page. In an embodiment of the invention, an estimated response time and an estimated resolution time corresponding to the email IDs is displayed on the email interface. The displayed estimated response time provides the time required by the customer service center to respond to the customer. The displayed estimated resolution time provides the time required by the customer service center to resolve the query or the request made by the customer. The estimated response time and the estimated resolution time are provided by an email system. The request to be made by the customer is sent through email. If the customer selects the email option at step 932, assistance is provided to the customer through email, at step 934. In an embodiment of the invention, the customer may ask for assistance through a message. The message includes, but is not limited to, a text message, multimedia message, and so forth. If the customer does not select the email option at step 932, the customer is redirected to step 904.

At step 936, the customer is given the option to select the Internet talk option. The Internet talk option provides Internet talk interface, wherein a list of Internet talk IDs are categorized on the basis of the type of request, geographical location or product/service on the web page. In an embodiment of the invention, an estimated wait time corresponding to the list of Internet talk IDs is displayed on the Internet talk interface. In an embodiment of the invention, a less busy time corresponding to the list of Internet talk IDs is displayed on the Internet talk interface. The estimated wait time and the less busy time are provided by an Internet talk system. Estimated wait time refers to the time a customer has to wait until he/she obtains a response from a customer service representative through Internet talk. Less busy time signifies that time during the day when the number of requests through Internet-related communication received by the customer service center in proportion to the staffing levels is less compared to the number of requests received at other times.

If the customer does not select the Internet talk option, the customer is redirected to step 904. At step 938, the customer is given the option to initiate and place a request through an Internet talk by selecting and providing a link that corresponds to an Internet talk ID on the Internet talk interface. The web page is connected to web-based applications through the central interface. The contact through Internet talk, between the customer and the customer service center, is established through web-based applications. A few examples of web-based applications are, Yahoo!® chat with voice application, and Google® talk. Further, when the customer initiates an Internet talk with the customer service representative, the customer is provided an option to select other modes of contact to interact with the customer service representative at the same time. The other modes of contact include, but are not limited to, chat and email.

In an embodiment of the invention, each Internet talk ID is provided with a link to initiate the Internet talk with an auto-customer service representative. When the customer places a request or asks a query, an automated response is generated by the auto-customer service representative based on customer's voice recognized by the Internet talk system. The Internet talk system is capable of auto voice recognition. The voice of the customer is interpreted using a voice browser of the Internet talk system. The interpreted voice of the customer is compared with already stored voice queries and requests in the knowledge database. If the interpreted voice matches a particular already stored voice query or request, an automated response corresponding to the voice query or request is provided by the knowledge database to the Internet talk system. The automated response is provided to the customer through the Internet talk interface by the Internet talk system. In an embodiment of the invention, a track of the time spent by the customer in trying to resolve a query via an Internet talk with auto-customer service representative is kept by an escalation system. If the time spent by the customer exceeds a particular threshold time, an option is provided by the escalation system to the customer to establish contact through other modes of contact. The other modes of contact may resolve the query. The other modes of contact include, but are not limited to, call, chat, email, Internet talk, IVR and so forth.

In an embodiment of the invention, the customer service representative is provided an option for co-browsing with the customer. On selecting the option, the customer service representative browses the web page along with the customer. In an embodiment of the invention, the Internet talk system enables a customer service representative to fill in a form displayed on the web page along with customer. The control to fill in the form may be entirely transferred to the customer by the customer service representative through the Internet talk system for filling in the details of specific fields of the form. The details of the specific fields of the form may be confidential and thus should be known only to the customer. Examples of the specific fields of the form includes, but are not limited to, passwords, transaction login name and password while making online payments, and so forth.

In an embodiment of the invention, the customer is provided an option to schedule the Internet talk for a queue corresponding to an Internet talk ID displayed on the Internet talk interface. On selecting the link, a request form to be filled in by the customer is provided on the Internet talk interface. The customer provides his/her Internet talk ID through the request form. If the customer chooses to initiate and place a request through the Internet talk option at step 938, assistance is provided to the customer through Internet talk as soon as a customer service representative, handling the type of request made by the customer, is available, at step 940. A contact is established between the customer and a customer service representative at the customer service center with the help of the web-based applications. The central interface interfaces the web page and the web-based applications. Examples of the web-based applications for Internet talk are, but are not limited to, Google® talk, Yahoo!® chat with voice, and the like.

At step 942, if the customer does not choose to initiate and place a request through the Internet talk option at step 938, a message service option corresponding to the Internet talk IDs is provided on the Internet talk interface. At step 944, through the Internet talk interface, the customer is given the option to select the message service option for a queue corresponding to an Internet talk ID. Along with selecting the message service option, the customer fills a customer data collection screen displayed on the web page. The data entered by the customer is stored in the processing module. The processing module keeps a track of the queue. At step 946, if the customer selects the message service option at step 944, a message is sent to the customer if the estimated wait time of the Internet talk falls below a predetermined value of estimated wait time within the specified time frame. The processing module sends the message to the message web gateway. The message is sent through the message web gateway to the network service provider through the Internet. The network service provider, in turn, delivers the message to the customer. The customer receives a notification regarding the estimated wait time through the message. In case the estimated wait time of the queue never falls below the predetermined value, a message is sent to the customer, notifying that the estimated wait time never falls below the predetermined value within the time frame and recommending to the customer other times, with lower estimated wait time, to use Internet talk as a mode of contact. The message may include, but is not limited to, a text message, multimedia message, and so forth. If the customer does not select the message service option at step 944, the customer is redirected to step 904.

At step 948, the customer is given a knowledge database search option to conduct a search using the search tool on the web page. The search tool is interfaced with the web page. A query to be searched is entered by the customer through the web page. The query is searched with the help of the search tool in a knowledge database. At step 950, if the customer selects the knowledge database search option at step 948 and enters a query, an automated response is displayed on the web page to conduct the search in the knowledge database. Further, a list of the modes of contact, arranged according to the estimated wait times for the modes of contact and the nature of the query, is displayed on the web page. All queries made by the customer and their responses are stored for predetermined time in the search tool.

In an embodiment of the invention, when the customer enters a request or a query, a ticket number is generated by the ticket management system corresponding to the request or query made by the customer. The customer may use the ticket number as a reference to track the status of the request or the query through the web page. The status may provide information relating to the state of the request or the query. Examples of status are 'request submitted', 'request closed', 'request active', 'request to be served on Nov. 10, 2006' and so forth. In an embodiment of the invention, if the customer makes a query to which no match of an automated response is found on searching in the knowledge database, then a suitable time is notified to the customer, wherein the suitable time is the maximum time required for updating the knowledge database with an automated response corresponding to the query. The knowledge database is updated by the customer service center with the automated response corresponding to the query before the suitable time notified to the customer. The automated response may then be obtained by the customer by providing the ticket number corresponding to the query through the web page after the suitable time. The automated response corresponding to the ticket number is displayed on the web page. If the customer does not select the knowledge database search option at step 948, the customer is redirected to step 904.

At step 952, the customer is given an option to select a pay-for-service option. At step 954, if the customer selects the pay-for-service option, a set of privileges is provided to the customer on selecting the pay-for-service option. The customer pays a certain amount to avail certain services. The set of privileges include, but are not limited to, faster response to the request made by the customer. The customer is further provided with an option to pay a premium fee to exchange positions in a queue. The customer would, in turn, get a faster response from the customer service representative at the customer service center by placing himself/herself ahead of other customers in the queue. The customer may, further, buy an 'express card'. This would enable the customer to exchange positions in a queue each time he/she avails any service or places a request. In an embodiment of the invention, the customer is provided with an option to join paid clubs. A set of privileges for the services is provided to the customer enrolled in the paid club. Advertisements, updates on products and services, new products and services are displayed on the web page. If the customer does not select the pay-for-service option at step 952, the customer is redirected to step 904. At step 956, after each interaction with the customer using the one or more modes of contact, the knowledge database search option, or the pay-for-service option, the customer is asked to fill a customer feedback form through a customer feedback option. The customer fills in customer feedback form and provides the feedback related to the services provided by the customer service center. The feedback forms are collected by a CSAT system and are, further, used to review and analyze the customers' feedback to provide better services to the customers.

In an embodiment of the invention, feedback about various products and services offered by the company is provided by the customer through the customer feedback option and is stored in a suggestions/feedback repository system. The customer may desire to provide feedback after using a product or availing a service offered by the company for a certain period of time. A feedback form is displayed on the web page when the customer wants to provide feedback through the web page. In an embodiment of the invention, suggestions to improve the products or services offered by the company are provided by the customer through the web page and are stored in suggestions/feedback repository system 126. Suggestions/feedback repository system 126 acts as a repository of the feedback and suggestions collected from the customers. In an embodiment of the invention, suggestions/feedback repository system 126 is monitored at regular time intervals by the customer service center. Further, the feedback and the suggestions of the customers are used to enhance the services and the products provided by the company to the customers.

At step 958, interactions between the customers and the customer service center, using the one or more modes of contact, the knowledge database search option, or the pay-for-service option, are stored in a CRM system. An interface is provided between the CRM system and the web page through a CRM module. The interactions between the customer and the customer service center may be through the web page, a telephone call through the ACD or through any other means. The interactions through the web page include, but are not limited to, chat, email or Internet talk. Further, all requests placed by the customers through the call-back option and the SMS option are stored in the CRM system. In addition, all queries made by the customers to be searched in the knowledge database are recorded in the CRM system. Further, the feedback forms and other interactions with the CSAT system are recorded in the CRM system. The recorded data is analyzed and used to predict future marketing by the CRM system. This, in turn, helps in improving customer relationships and delivering better products and services to the customers. In addition, all interactions between customers and the customer service center can be retrieved by the customer service representative while providing assistance to the customers. After step 958, the customer is given an option to quit from the web page, at step 960. If the customer does not choose to quit, the customer is redirected to step 904.

The method and the system described above are applicable to Internet browsers in hand-held devices for accessing website of a company. The hand-held devices include, but are not limited to, mobile devices, palm tops, Personal Digital Assistants (PDAs), smartphones, laptops, and so forth.

The method and the system described above are applicable to one or more companies. A web page displays options for interacting with customer service centers of the one or more companies. The web page is interfaced to the web portals of the one or more companies. The method and system, as described above, imply individually to the web-based systems of respective one or more companies.

The various embodiments of the present invention exemplify the following advantages. The method and system described in the present invention enables the customer to contact the customer service center through the different modes of contact available on a single web page. The awareness of other alternatives other than telephone call to contact the customer service center helps in reducing reliance on telephone calls only. Moreover, the estimated wait time and the less busy time are provided for each mode of contact on the web page. This helps in leveling spikes in the incoming and outgoing call patterns of the customer service center. Further, the method and system described in the present invention provide storing of certain automated responses to the most frequent queries by the customers, which in turn, reduces the overall cost of providing customer service. Moreover, it helps in reducing the overall staffing requirement of customer service representatives. The method and system allows the company to conduct customer service related surveys with ease. This helps in improving the services and products delivered to the customers. Further, the web page can help in advertising the products and services that the company offers. In addition, the web page may advertise new products, new services and their updates. The web page advertising helps in improving the brand name of the company in the market.

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer comprises a microprocessor. The microprocessor is connected to a communication bus. The computer also includes a memory. Memory may include random access memory (RAM) and read only memory (ROM). The computer system further comprises a storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for providing assistance to a customer of a company through a web based system, the company having a customer service center, the customer service center supported by an automatic call distributor (ACD), an Interactive Voice Response (IVR) system, a work flow management (WFM) system, a web portal, one or more web-based applications, a knowledge database, map functions, a message web gateway, a customer satisfaction (CSAT) system, a customer relationship management (CRM) system and a suggestions/feedback repository system, the method comprising:
   a. providing a web page on the web portal, the web page acting as an interface between the customer and the customer service center of the company;
   b. providing one or more options on the web page to be selected by the customer, the one or more options corresponding to one or more modes of contact between the customer and customer service representatives at the customer service center;
   c. providing an estimated wait time on the web page, for at least one of the one or more modes of contact;
   d. providing an estimated less busy time on the web page for at least one of the one or more modes of contact; and
   e. providing a knowledge database search option;
      wherein the estimated wait time and the estimated less busy time are each determined from statistical data based on data collected over a period of time, said collected data related to incoming and outgoing calls on a regular basis and further related to each customer service representative's performance and time taken to complete a customer request.

2. The method of claim 1 further comprising a step of displaying a call-back option for the customer, the call-back option being displayed on the web page.

3. The method of claim 2, wherein the ACD automatically connects the customer and a customer service representative if the customer selects the call-back option.

4. The method of claim 1 further comprising a step of sending a message to the customer based on the one or more options selected by the customer.

5. The method of claim 1 further comprising a step of sending a message to the customer, when the estimated wait time for the one or more options selected by the customer falls below a predetermined value.

6. The method of claim 1 further comprising a step of sending a message to the customer when the estimated wait time for the one or more options selected by the customer never falls below a predetermined value, within a predetermined interval of time.

7. The method of claim 1 further comprising a step of providing one or more pay-for-service options on the web page.

8. The method of claim 7, wherein the one or more pay-for-service options allow the customer in a queue of customers to exchange positions with other customers in the queue.

9. The method of claim 1 further comprising a step of displaying a site locator option on the web page, the site locator option providing maps and directions for a physical location to the customers.

10. The method of claim 1 further comprising a step of collecting feedback from the customer through the web based system.

11. The method of claim 1, wherein the one or more options are selected from a group comprising a chat, an email, a call and an Internet talk.

12. The method of claim 1 further comprising a step of displaying the one or more options, when at least one from the one or more options is selected by the customer to establish contact with a customer service representative, and, wherein the one or more options displayed allow the customer to establish contact with the customer service representative at the same time.

13. The method of claim 1 further comprising a step of providing an option to co-browse the web page with the customer, wherein the option to co-browse the web page is provided to a customer service representative at the customer service center, wherein the assistance is provided by the customer service representative to the customer through at least one from the one or more modes of contact.

14. The method of claim 1 further comprising a step of providing an option to the customer service representative to fill a form along with the customer.

15. The method of claim 14, wherein the customer service representative transfers the control entirely to the customer while filling details in specific fields of the form.

16. The method of claim 1, wherein the knowledge database search option is used for searching in the knowledge database.

17. The method of claim 1 further comprising a step of assigning a ticket number corresponding to an action chosen from the group consisting of: a query made by the customer through the knowledge database search option, a request made by the customer through the web page, and a transaction made by the customer through the web page.

18. The method of claim 1 further comprising a step of providing a customer login name to the customer registering to the company, wherein the customer registers through the web page.

19. The method of claim 1 further comprising a step of defining a query for the customer through the web page, wherein the customer is provided query-defining options through the web page.

20. The method of claim 1 further comprising a step of defining a query for the customer through the web page, wherein the customer is provided a problem capture form on the web page, wherein the customer fills in the problem capture form for defining the query.

21. The method of claim 1 further comprising a step of providing one or more solutions to a problem of the customer through the web page, wherein the customer enters the problem through the web page.

22. The method of claim 1 further comprising a step of recording all interaction between the customers and the customer service center.

23. The method of claim 1 further comprising a step of retrieving all interactions between the customer and the customer service center recorded while providing assistance to the customer, wherein the interactions are retrieved by a customer service representative providing assistance to the customer.

24. The method of claim 1 further comprising a step of providing an option to select a mode of contact from one or more modes of contact when time spent by the customer in trying to resolve a query through a mode of contact exceeds a threshold time.

25. A non-transitory computer readable medium having a computer readable program code embodied therein for providing assistance to a customer of a company through a web based system, the company having a customer service center, the customer service center supported by an automatic call distributor (ACD), an Interactive Voice Response (IVR) system, a work flow management (WFM) system, a web portal, one or more web-based applications, a knowledge database, map functions, a message web gateway, a customer satisfaction (CSAT) system, a customer relationship management (CRM) system and a suggestions/feedback repository system, the computer program product comprising a computer readable medium having a computer readable program code embodied therein, the computer readable program code containing instructions for performing the steps of:
   a. providing a web page on the web portal, the web page acting as an interface between the customer and the customer service center of the company;
   b. providing one or more options on the web page to be selected by the customer, the one or more options corresponding to one or more modes of contact between the customer and customer service representatives at the customer service center;
   c. providing an estimated wait time on the web page, for at least one of the one or more modes of contact;
   d. providing an estimated less busy time on the web page for at least one of the one or more modes of contact; and
   e. providing a knowledge database search option;
      wherein the estimated wait time and the estimated less busy time are each determined from statistical data based on data collected over a period of time, said collected data related to incoming and outgoing calls on a regular basis and further related to each customer service representative's performance and time taken to complete a customer request.

26. A web based system for providing assistance to a customer of a company, the company comprising a customer service center, the customer service center supported by an automatic call distributor (ACD), an Interactive Voice Response (IVR) system, a work flow management (WFM) system, a web portal, one or more web-based applications, a knowledge database, map functions, a message web gateway, a customer satisfaction (CSAT) system, a customer relationship management (CRM) system and a suggestions/feedback repository system, the web based system comprising:
   a. a web page, the web page being provided on the web portal of the company, the web page comprising:
      i. one or more options corresponding to one or more modes of contact between customer service representatives at the customer service center, and the customer;
      ii. an estimated wait time for at least one or more options selected by the customer;
      iii. an estimated less busy time for at least one or more options selected by the customer;
      iv. an estimated response time for at least one or more options selected by the customer;

v. an estimated resolution time for at least one or more options selected by the customer; and vi. a knowledge database search option for allowing the customer to search the knowledge database, wherein the estimated wait time, the estimated less busy time, the estimated response time, and the estimated resolution time are each determined from statistical data based on data collected over a period of time, said collected data related to incoming and outgoing calls on a regular basis and further related to each customer service representative's performance and time taken to complete a customer request;

b. an ACD module, the ACD module interacting with the automatic call distributor and the web page;

c. a WFM module, the WFM module interacting with the work flow management and the web page;

d. a central interface provided between the web page and the one or more web-based applications; and e. a search tool, the search tool interacting with the web page and the knowledge database.

27. The web based system of claim 26 further comprising a chat system, the chat system providing the estimated wait time and the estimated less busy time for chat between the customer and the customer service representatives.

28. The web based system of claim 26 further comprising an email system, the email system providing the estimated response time and the estimated resolution time for email between the customer and the customer service representatives.

29. The web base system of claim 26 further comprising an Internet talk system, the Internet talk system providing the estimated wait time and the estimated less busy time for Internet talk between the customer and the customer service representatives.

30. The web based system of claim 26 further comprising a CRM module, the CRM module interacting with the web page and the CRM system.

31. The web based system of claim 26 further comprising a ticket management system, the ticket management system assigning a ticket number to an action chosen from the group consisting of a query made by the customer through the knowledge database search option, a request made by the customer through the web page, and a transaction made by the customer through the web page.

32. The web based system of claim 26 further comprising an escalation system, the escalation system providing options to the customer to select other modes of contact to resolve a query when the time spent by the customer while trying to resolve the query through a mode of contact exceeds a threshold time.

33. The web based system of claim 26 further comprising a workflow-based resolution system, the workflow-based resolution system providing an update of status of a request made or a query asked by the customer to the customer service center.

34. The web based system of claim 26, wherein the web page displays a call-back option and a message service option.

35. The web based system of claim 34 further comprising a processing module, wherein the processing module interacts with the ACD to connect one of the customer service representatives to the customer, if the customer selects the call-back option.

36. The web based system of claim 35, wherein the processing module sends a message to the customer based on a predetermined condition, if the customer selects the message service option.

37. The web based system of claim 36, wherein the predetermined condition is the estimated wait time of a mode of contact selected by the customer falling below a predetermined level, within a predetermined amount of time.

38. The web based system of claim 36, wherein the predetermined condition is the estimated wait time never falling below a predetermined level, within a predetermined amount of time.

39. The web based system of claim 26, wherein the web page further comprises information regarding the one or more modes of contact.

40. The web based system of claim 26, wherein the web page further comprises information regarding one or more pay-for-service options, wherein the pay-for-service options provide the customer a set of privileges upon paying a certain amount for a service.

41. The web based system of claim 26, wherein the web page further comprises a site locator option, wherein the site locator option interacts with the map function and provides maps and directions for physical locations to the customer.

42. The web based system of claim 26, wherein the web page further comprises a customer feedback option, wherein the customer feedback option interacts with the CSAT system and the suggestions/feedback repository system, wherein the customer feedback option provides an option to the customer to provide feedback to the customer service center.

43. The web based system of claim 26, wherein the web page further comprises a register online option, wherein the register online option enables the customer to register with the company and obtain a customer login name, wherein the customer uses the customer login name to interact with the customer service center.

44. The web based system of claim 26, wherein the web page further comprises a define-query option, wherein the define-query option enables the customer to define a query.

45. The web based system of claim 44, wherein the customer defines the query by selecting one or more query-defining options displayed on the web page.

46. The web based system of claim 44, wherein the customer defines the query by filling in a problem capture form.

47. The web based system of claim 26, wherein the web page further comprises a purchase-related-query option, wherein the customer obtains one or more solutions to a problem entered by the customer through the purchase-related-query option.

48. The web based system of claim 26, wherein the one or more web-based applications are selected from a group comprising a chat application, an email application and an Internet talk application.

49. The web based system of claim 26, wherein the search tool searches in the knowledge database of the company, if the customer selects the knowledge database search option and enters a query.

50. The web based system of claim 26, wherein the search tool stores a query entered by the customer for a predetermined time.

51. The web based system of claim 50 wherein the search tool stores one or more responses to the query for a predetermined time.

* * * * *